United States Patent
Bryce et al.

(10) Patent No.: US 12,014,254 B2
(45) Date of Patent: *Jun. 18, 2024

(54) MACHINE LEARNING-BASED METHODS AND SYSTEMS FOR MODELING USER-SPECIFIC, ACTIVITY SPECIFIC ENGAGEMENT PREDICTING SCORES

(71) Applicant: Broadridge Financial Solutions, Inc., Newark, NJ (US)

(72) Inventors: Richard Bryce, Newark, NJ (US); Joseph Lo, Newark, NJ (US); Luca Marchesotti, Newark, NJ (US)

(73) Assignee: Broadridge Financial Solutions, Inc., Newark, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/148,225

(22) Filed: Dec. 29, 2022

(65) Prior Publication Data
US 2023/0141007 A1    May 11, 2023

Related U.S. Application Data

(63) Continuation of application No. 17/482,057, filed on Sep. 22, 2021, now Pat. No. 11,544,627.

(51) Int. Cl.
    *G06N 20/00*    (2019.01)
(52) U.S. Cl.
    CPC ................................ *G06N 20/00* (2019.01)
(58) Field of Classification Search
    CPC .................................................. G06N 20/00
    See application file for complete search history.

(56) References Cited

U.S. PATENT DOCUMENTS

| | | |
|---|---|---|
| 2019/0180358 A1 | 6/2019 | Nandan et al. |
| 2019/0213900 A1 | 7/2019 | Erickson et al. |
| 2019/0340684 A1 | 11/2019 | Belanger et al. |
| 2020/0065772 A1 | 2/2020 | Whitehead et al. |
| 2020/0074546 A1 | 3/2020 | Coulter |

(Continued)

OTHER PUBLICATIONS

Mashrur et al., "Machine learning for financial risk management: A survey." IEEE Access 8 (2020): 203203-203223. (Year: 2020).

(Continued)

*Primary Examiner* — Casey R. Garner
(74) *Attorney, Agent, or Firm* — GREENBERG TRAURIG, LLP

(57) ABSTRACT

A machine-learning based method includes receiving an instruction to model an engagement predicting score for a user. User-specific, activity-specific data is obtained from digital resources that include a user-specific activity performance data regarding performance of at least one activity by the user, an object data for an object that allows the user to perform the at least one activity, and user-specific personal data of the user. A user-specific activity engagement labeling data for the at least one activity is predicted by utilizing a first-type data pipeline on the at least one user-specific activity performance data. User-specific, activity-specific data features are predicted by utilizing a second-type data pipeline on the user-specific, activity-specific data. The engagement predicting score is predicted from the user-specific, activity-specific data features and the user-specific activity engagement labeling data. A computing device is instructed to present at least one user-specific activity-related action instruction.

20 Claims, 23 Drawing Sheets

(56) References Cited

U.S. PATENT DOCUMENTS

| | | |
|---|---|---|
| 2020/0082294 A1 | 3/2020 | Malhotra et al. |
| 2020/0327604 A1 | 10/2020 | Morin et al. |
| 2020/0387606 A1 | 12/2020 | Gribelyuk et al. |
| 2021/0133509 A1 | 5/2021 | Wall et al. |
| 2021/0166311 A1 | 6/2021 | Cella et al. |
| 2021/0241320 A1 | 8/2021 | Chaudhari et al. |
| 2021/0343176 A1 | 11/2021 | Harlow et al. |

OTHER PUBLICATIONS

Orji et al., "Using Machine Learning to Explore the Relation Between Student Engagement and Student Performance." In 2020 24th International Conference Information Visualisation (IV), pp. 480-485. IEEE, 2020. (Year: 2020).

Camacho et al., "Data Capture and Multimodal Learning Analytics Focused on Engagement With a New Wearable IoT Approach." IEEE Transactions on Learning Technologies 13, No. 4 (2020): 704-717. (Year: 2020).

MACHINE LEARNING-BASED METHODS AND SYSTEMS FOR MODELING USER-SPECIFIC, ACTIVITY SPECIFIC ENGAGEMENT PREDICTING SCORES

FIELD OF TECHNOLOGY

The present disclosure generally relates to improved machine learning-based systems, and more specifically to machine learning based methods and systems for modeling user-specific, activity-specific engagement predicting scores.

BACKGROUND OF TECHNOLOGY

A computer network system may include a group of computers (e.g., clients, servers, smart routers) and other computing hardware devices that are linked together through one or more communication channels to facilitate communication and/or resource-sharing, via one or more specifically programmed graphical user interfaces (GUIs) of the present disclosure, among a wide range of users.

SUMMARY OF DESCRIBED SUBJECT MATTER

In some embodiments, the present disclosure provides an exemplary technically improved computer-based method that includes receiving, by a machine-learning processor, an instruction to model at least one user-specific activity-specific engagement predicting score for at least one user from a plurality of users. User-specific, activity-specific data may be obtained, by the machine-learning processor, from a plurality of digital resources, based on the instruction, where the user-specific, activity-specific data may include: (i) at least one user-specific activity performance data regarding performance of at least one activity by the at least one user, (ii) at least one object data for at least one object that allows the at least one user to perform the at least one activity, and (iii) at least one user-specific personal data of the at least one user. A user-specific activity engagement labeling data for the at least one activity may be predicted, by the machine-learning processor, by utilizing a first-type data pipeline on the at least one user-specific activity performance data. A plurality of user-specific, activity-specific data features may be predicted, by the machine-learning processor, by utilizing a second-type data pipeline on the user-specific, activity-specific data. The at least one user-specific activity-specific engagement predicting score may be predicted, by the machine-learning processor, based on at least one machine-learning model, by utilizing: (i) the user-specific activity engagement labeling data for the at least one activity, and (ii) the plurality of user-specific, activity-specific data features. At least one computing device may be instructed, by the machine-learning processor, based on the at least one user-specific activity-specific engagement predicting score, to present at least one user-specific activity-related action instruction that predicts at least one user-specific activity-related action to be performed with at least one user.

In some embodiments, the present disclosure provides an exemplary technically improved computer-based system that includes at least the following components a memory and a machine-learning processor which executes computer code that causes the machine-learning processor to receive an instruction to model at least one user-specific activity-specific engagement predicting score for at least one user from a plurality of users, to obtain from a plurality of digital resources, based on the instruction, user-specific, activity-specific data, where the user-specific, activity-specific data may include (i) at least one user-specific activity performance data regarding performance of at least one activity by the at least one user, (ii) at least one object data for at least one object that allows the at least one user to perform the at least one activity, and (iii) at least one user-specific personal data of the at least one user, to predict a user-specific activity engagement labeling data for the at least one activity by utilizing a first-type data pipeline on the at least one user-specific activity performance data, to predict a plurality of user-specific, activity-specific data features by utilizing a second-type data pipeline on the user-specific, activity-specific data, to predict based on at least one machine-learning model, the at least one user-specific activity-specific engagement predicting score, by utilizing (ii) the user-specific activity engagement labeling data for the at least one activity, and (ii) the plurality of user-specific, activity-specific data features, and to instruct based on the at least one user-specific activity-specific engagement predicting score, at least one computing device to present at least one user-specific activity-related action instruction that predicts at least one user-specific activity-related action to be performed with at least one user.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
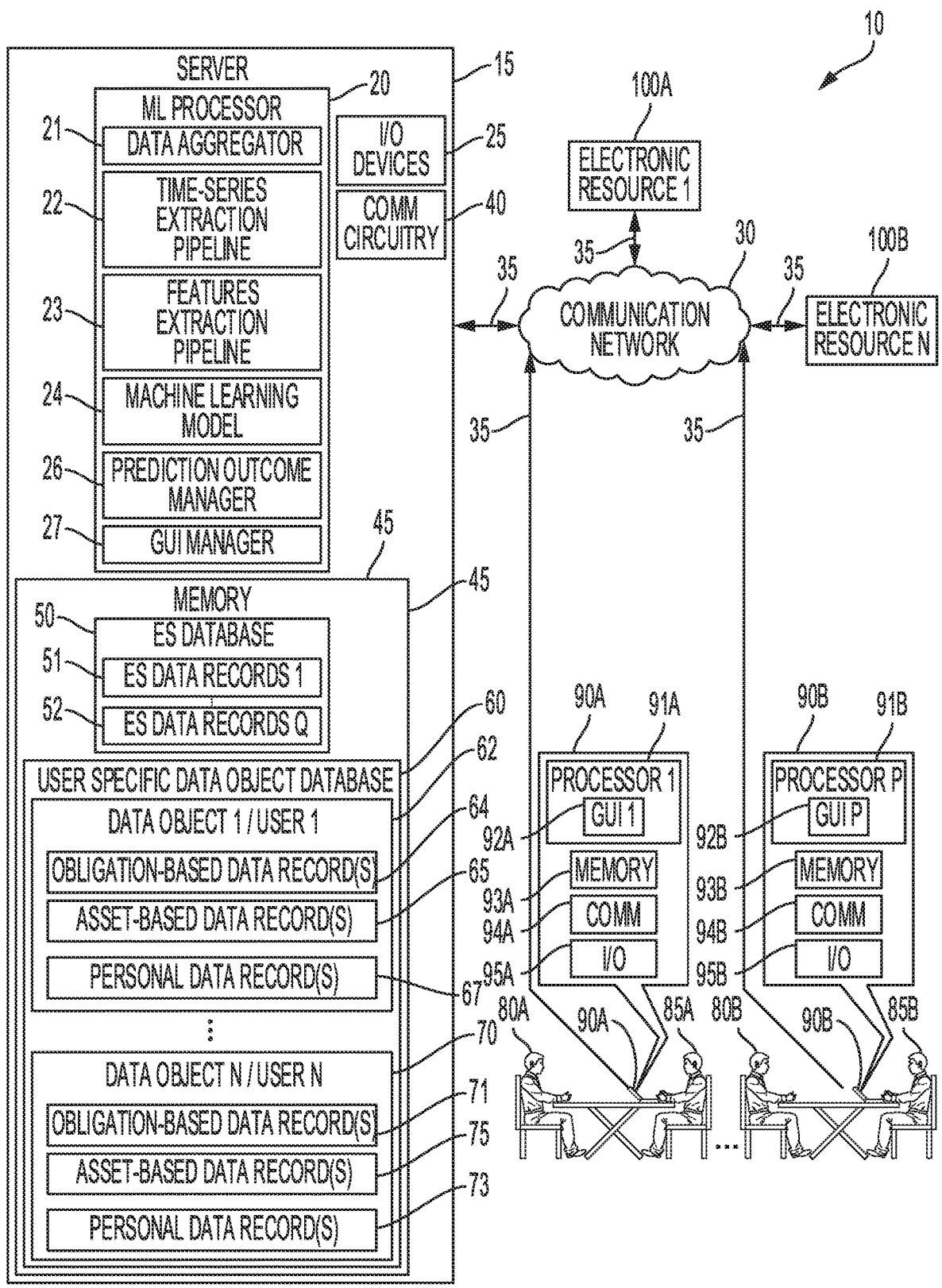
FIG. 1 is a block diagram of a system for modeling user-specific, activity-specific engagement predicting scores in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

Embodiments of the present disclosure herein disclose systems and methods for increasing yields from securities-based lending (SBL) products issued by an entity. At least one machine learning model (MLM) may be trained to predict via a utilization prediction score for each of a plurality of potential borrowers having a higher likelihood of generating high yields through the analysis of previous borrowing patterns. The at least one MLM may be configured to recommend actions to be taken by investment advisors to maximize yields from the portfolios of the potential borrowers targeted from a plurality of customers. The at least one MLM may be configured to suggest drawdown and/or payback actions aimed at current borrowers to minimize tax expenditure, banking fees and other taxes/commissions. Stated differently, the at least one MLM is configured to predict, for a given loan/line of credit (e.g., SBL), the probability that the line of credit will be used by a borrower in a predefined time interval after the line of credit is opened, such as a year, for example.

A plurality of user-specific data objects may be associated with a plurality of users and managed by a server associated with an entity. The plurality of user-specific data objects may include a plurality of user-specific activity performance data (e.g., debts/loans/lines of credit), a plurality of object data (e.g., assets/financial accounts) that allows the user to perform the at least one activity (e.g., since the asset and financial accounts provide collateral for the loan and/or line of credit), and/or personal data (e.g., PII, age, gender, demographic attributes, psychographic attributes, and/or behavioral attributes).

Optionally and/or alternatively, data may be stored may be stored in data records. Thus, the plurality of user-specific data objects may store obligation-based data records (e.g., debts, loans, and/or lines of credit), asset-based data records (e.g., assets/financial accounts), and/or personal data records, for example as shown herein below in FIG. 1.

The entity server may transfer to a customer's account, an SBL line of credit to the customer's debt portfolio such that if used by the customer, the line of credit may generate yields and value for the entity. The entity may maintain a database of entity data records of the lines of credit given to any of the plurality of customers. The likelihood that a customer may use a line of credit based on the customer's asset portfolio, and debt portfolio as well as historical activity data in the debt portfolio may be modeled as a utilization prediction score outputted by a machine learning model. The utilization prediction score may also be referred to herein as a user-specific activity specific engagement predicting score.

In some embodiments, the utilization prediction score may be indicative of a first likelihood that the at least one user will use a line of credit generating revenue for the entity. In other embodiments, the utilization prediction score may be indicative of a second likelihood that the at least one user will churn, or close, the line of credit after given to the at least one user by the entity, where churning reduces revenue for the entity. In yet other embodiments, the utilization prediction score may be based on both the first and second likelihoods.

In some embodiments, a user obtaining a line of credit from an entity such as a financial institution. The term churning as used herein may refer to the user closing the line of credit without having drawn-down on the line of credit. In other embodiments, the term churning as used herein may refer to the user closing the line of credit having drawn-down on the line of credit. As churn reduces income yield to the lending entity, the entity may provide incentive(s) in order to reduce churn such as, for example, lower fees, lower interest rates or other incentives to utilize the line of credit. In some embodiments features which may impact the probability of churn include tenure (length of time since the line of credit was established), market value trends (of the underlying assets under management), cash trends (within the account) and the number of days since the most recent activity on the line of credit account.

FIG. 1 is a block diagram of a system 10 for modeling user-specific, activity-specific engagement predicting scores in accordance with one or more embodiments of the present disclosure. System 10 may include a server 15, P computing devices 90A and 90B where P is an integer, and/or M electronic resources 100A and 100B denoted ELECTRONIC RESOURCE1 . . . ELECTRONIC RESOURCEM all communicating 35 over a communication network.

In some embodiments, the server 15 may be associated by an entity or a financial entity that may provide securities-based lending (SBL) lines of credit to users (e.g., customers) such as a user 80A and a user 80B by an entity user (e.g., a financial advisor) such as an entity user 85A and an entity user 85B. The entity user (e.g., the banker or financial advisor) may perform the profiling analyses for at least one user using the system 10 to determine a likelihood that the at least one user may use the SBL line of credit offered by the financial institution and thus, generate yields for the financial institution when the at least one user uses the SBL line of credit. The entity user, such as a banker, financial advisor and the like, may use the user-specific output data from system 10 to determine whether or not to offer the SBL line of credit to the at least one user (e.g., the at least one customer).

In some embodiments, an electronic resource or digital resource in the context used herein may refer to, but not limited to a resource in which a user's financial and/or personal data may be stored in a plurality of data elements such as in a storage device of any bank and/or financial entity computing server. An electronic resource may also include, for example, social media and/or other data repositories such as Facebook, Twitter, Google, Instagram, and/or LinkedIn, for example, and accessible over the communication network 30 with user-specific data that may be useful in determining both creditworthiness and/or SBL credit line usage. The terms electronic resource and digital resource may be used interchangeably herein.

In some embodiments, the server 15 may include a machine-learning processor 20 for executing, in part, machine-learning and/or prediction algorithms, input and/or output (I/O) devices 25, a communication circuitry 40 and a memory 45. The machine-learning processor 20 may execute software code in software modules for performing the functions described herein. The software modules may include a data aggregator 21, a time-series extraction pipeline 22, a features extraction pipeline 23, a machine learning model 24, a prediction outcome manager 26, and/or a graphic user interface (GUI) Manager 27.

In some embodiments, the memory 45 may store an entity server (ES) database 50 and/or a user-specific data object database 60. The ES database 50 may include a plurality of Q ES data records where Q is an integer denoted by ES DATA RECORD1 51 . . . ES DATA RECORDQ 52.

In some embodiments, the user-specific data object database 60 may include a plurality of N data objects where N is an integer denoted by DATA OBJECT1/USER1 62 . . . DATA OBJECTN/USERN 70. Each data object in the user-specific data object database 60 may be used for holding data records related to a unique user. For example, the DATA OBJECT1/USER1 62 may include at least one obligation-based data record 64, at least one asset-based data record 65, and/or at least one personal data record 67. The term portfolio 65 may be used synonymously with the at least one asset-based data record 65 that may include all of USER1's assets, bank accounts, securities holding, etc. Similarly, the DATA OBJECTN/USERN 70 may include at least one obligation-based data record 71, at least one asset-based data record 75, and/or at least one personal data record 73. A term portfolio 75 of USERN may be used synonymously with the at least one asset-based data record 72 that may include all of USERN's assets, bank accounts, securities holding, etc.

In some embodiments, the user 80A may interact with the entity user 85A. The entity user 85A may enter personal details and/or financial details of the user 80A into a graphic user interface1 92A denoted GUI1 of the computing device 90A that is in communication 35 to transmit to and/or receive data from the server 15. Similarly, the user 80B may interact with the entity user 85B. The entity user 85B may enter personal details and/or financial details of the user 80B into a graphic user interface1 92B denoted GUIP of the computing device 90B that is in communication 35 to transmit to and/or receive data from the server 15.

In some embodiments, the computing device 90A may include a processor1 91A, a memory 93A, a communication circuitry 94A for communicating 35 over the communication network 30, and input and/or output (I/O) devices 95A. The processor1 91A may receive instructions from GUI Manager 27 to control the GUI1 92A via the communication network 30. Similarly, the computing device 90B may include a processorP 91B, a memory 93B, a communication circuitry 94B for communicating 35 over the communication network 30, and input and/or output (I/O) devices 95B.

The processorP 91B may receive instructions from GUI Manager 27 to control the GUIP 92B via the communication network 30.

Figure 2:
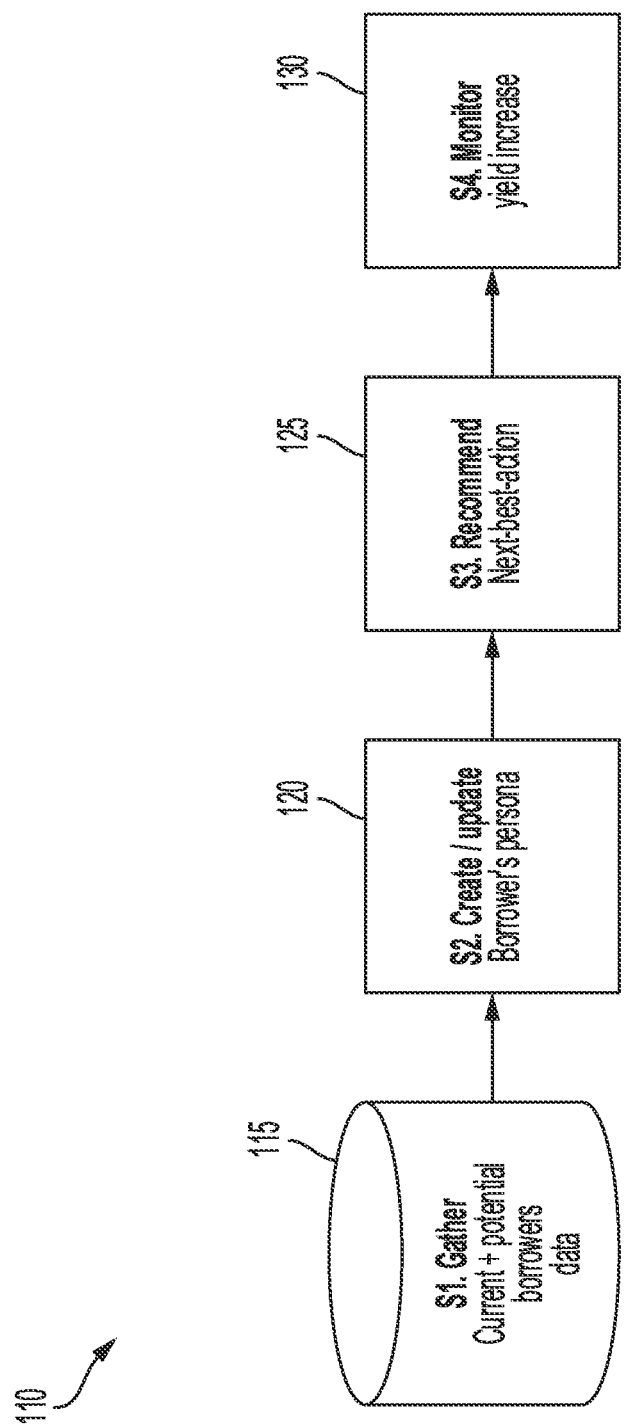
FIG. 2 is a flow diagram for modeling user-specific, activity-specific engagement predicting scores in accordance with one or more embodiments of the present disclosure.

FIG. 2 is a flow diagram 110 for modeling user-specific, activity-specific engagement predicting scores in accordance with one or more embodiments of the present disclosure. The flow diagram 110 may represent a top-level flow diagram of the method for modeling user-specific, activity-specific engagement predicting scores that may include a gathering step S1 115, a creation and/or update step S2 120 of a borrower's persona, a recommendation step S3 125 for recommending the next-best action for getting the user to apply for an SBL line of credit and to use it, and a monitoring step S4 130 where yields generated from the user's use of the SBL line of credit may be monitored. The utilization prediction score may be a loan-to-value (LTV) metric assigned to the user.

In some embodiments, in the gathering step S1 115, a series of data transforms, aggregations, and filtering (i.e. an algorithm) may be used to create a proprietary set of information that may include data queried and structured in a specific way in order to provide information to a user or a system; also known as a "data feature" stored in data records in the electronic resources. This data may include (i) historical user-specific data that may be collected from any of the plurality of electronic resources 100A and 100B associated with financial institutions, (ii) data shared by the users (e.g. borrowers) about themselves, their assets, and any other user-specific personal data, (iii) social media and other digital data related to the borrower's digital footprint from any of the plurality of electronic resources 100A and 100B associated with social media sites and/or databases, and/or (iv) third-party data from any of the plurality of electronic resources 100A and 100B associated with third-party data websites and/or databases.

In some embodiments, the data aggregator 21 may receive historical data over the communication network 30 related to the borrower such as historical borrowing data may be used to generate data features that may include, but are not limited to, the composition of each portfolio (and the ratios of each asset in relation to every other asset), changes in composition, transactions, currently pledged and non-pledged collateral, abandoned loan applications, drawdown and payback rates, market movement in underlying pledged and non-pledged positions for customers, duration, amount, credit worthiness as well as ratios, trends, averages, medians, correlations data element stored in the obligation-based data record of a particular user (e.g., borrower).

In some embodiments, the data aggregator 21 may receive data shared by borrowers may include personal identification information (PII) that the borrower may share with a financial institution to get access to services and products. Typical examples of such information are (i) Name and Surname, (ii) Full Address, (iii) Social Security number, and/or (iv) date of birth.

In some embodiments, the data aggregator 21 may receive data from social media and other data repositories. This may be data that the borrower has already shared on social media and on other digital repositories. Examples of such repositories may include Linkedin, Twitter, Facebook, Instagram as well as Demographic and psychographic consumer databases (e.g., Acxiom).

In some embodiments, the data aggregator 21 may receive third party data that may include a broad range of institutional grade data, including real-time and historical stock prices, fundamentals, forex, and/or cryptocurrency. Moreover, a broad range of financial news may be collected and aggregated by third-party providers that may be a very valuable source of information to detect macro events that may influence borrower's behaviors and driving yields.

In some embodiments, given a borrower's PII data point, all of the data sources stored in the plurality of electronic resources as described above may be scanned to associate data relevant to the target borrower. In particular, pattern matching, Natural Language processing (NLP), probabilistic analyses, or any combination thereof may be used to associate the information found in the plurality of electronic resources to the PII data of the borrower.

Figure 3:
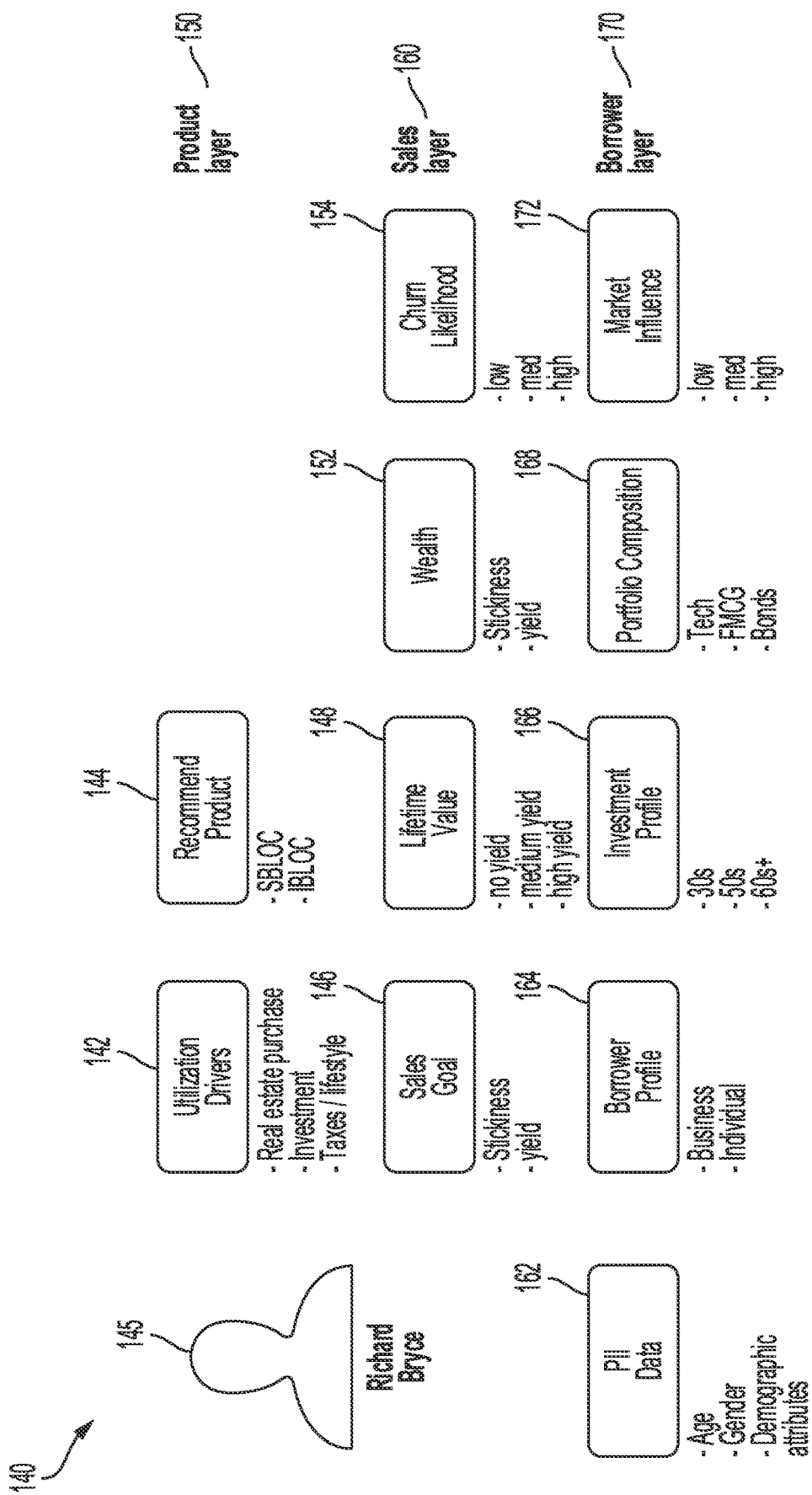
FIG. 3 schematically illustrates a set of data attributes of a user from aggregated user-specific data in accordance with one or more embodiments of the present disclosure.

FIG. 3 schematically illustrates a set of data attributes 140 of a user 145 from aggregated user-specific data in accordance with one or more embodiments of the present disclosure. The aggregated user-specific data may be used to create and/or update the Borrower's persona as in step S2 120 of FIG. 2. The set of attributes 140 for the user 145 named Richard Bryce, for example, may be defined at three levels: a product layer 150, a sales layer 160, and a borrower layer 170.

In some embodiments, the data attributes associated with the borrower layer 170 may include data features that may be identified where customers who have pledged marketable securities against a non-purpose loan which may be labelled according to specific pre-defined customer segments. The data attributes may include PII Data 162, a borrower profile 164, an investment profile 166, a portfolio composition 168, and a market influence 172. This analysis may be used to seed machine learning algorithms which may provide the basis to identify likely borrower behavior across the broader SBL loan book that may also be applied to the company's wider wealth client base to identify prospective borrowers and their likely borrower behavior. In addition, the investment profile and portfolio composition may by captured in the borrower layer 170.

In some embodiments, the data attributes associated with the sales layer 160 may include attributes that are instrumental to sales and marketing operations. The data attributes may include a sales goal 146, a lifetime value 148, wealth 152, and a churn likelihood 154. In particular, attributes such as the lifetime value 148 and the churn likelihood 154 may be used by salesforce-tailor marketing messages and may be used to prioritize communication with certain cohorts of borrowers.

In some embodiments, the data attributes of the product layer 150 may include attributes such as utilization drivers 142 and a product recommendation 144 that capture the interaction of the borrower with products or the suitability for a specific product. These attributes may be evaluated simultaneously by running machine learning algorithms. The training and test data may be used to generate machine learning models for each attribute described above.

In some embodiments, the machine learning model 24 may be validated against labelled customer data in order to determine the optimal algorithm for a given set of customers. As new customers with marketable securities collateral are provided, the machine learning model 24 may be re-trained to provide an optimized algorithm by dynamically adjusting the parameters of the features and the underlying code that generates the features each runtime.

In some embodiments, the user-specific data attributes from step S2 120 of FIG. 2 may be inputted to the machine learning model 24. The machine learning model 24 may output in the step S3 125 on the GUI1 92A . . . GUIP 92B, the recommended next-best-action that the entity user or the financial advisor may take to increase the likelihood that the user may use an SBL line of credit if offered. For example, once the borrower's attributes are calculated, they can be used to suggest next actions. Such actions may be taken programmatically such as by the server 15 automatically sending email messaging about the SBL line of credit, for example, or by a sales representative calling a borrower likely to churn upon reading the outputted recommended next-best-action for the borrower on the GUI1 92A . . . GUIP 92B. When applied to multiple customers, of particular interest may be the ability to create multi-level, hyper-customized marketing campaigns targeting cohorts of borrowers that are more likely to generate yields for the financial institution.

In some embodiments, the terms "features" and "attributes" may be used interchangeably herein.

In some embodiments, if the SBL line of credit may be underutilized, a prescriptive action may be to implement a marketing campaign to generate movement and to prevent SBL churning. If the SBL line of credit may be overutilized, a prescriptive action may be to alert the borrower alternative ways to get credit. If the SBL line of credit may be leveraged, a prescriptive action may be to alert the borrower. If the SBL line of credit may be non-optimized with different line movement patterns, such as with Big-Small movements, for example, a prescriptive action may be to alert the borrower to suggest alternative ways to get credit. The prescription actions may also be referred to as user-specific, activity-related actions.

In some embodiments, the prediction outcome manager 26 may be used in Step S4 130 to monitor yields and to evaluate the impact of each prescriptive action on borrower behavior that may be put in place based on the machine learning models 24. Based on the monitoring results, the prescriptive actions on borrower behavior may be optimized.

In some embodiments, the machine learning model 24 may perform the functions of the prediction outcome manager 26.

Figure 4:
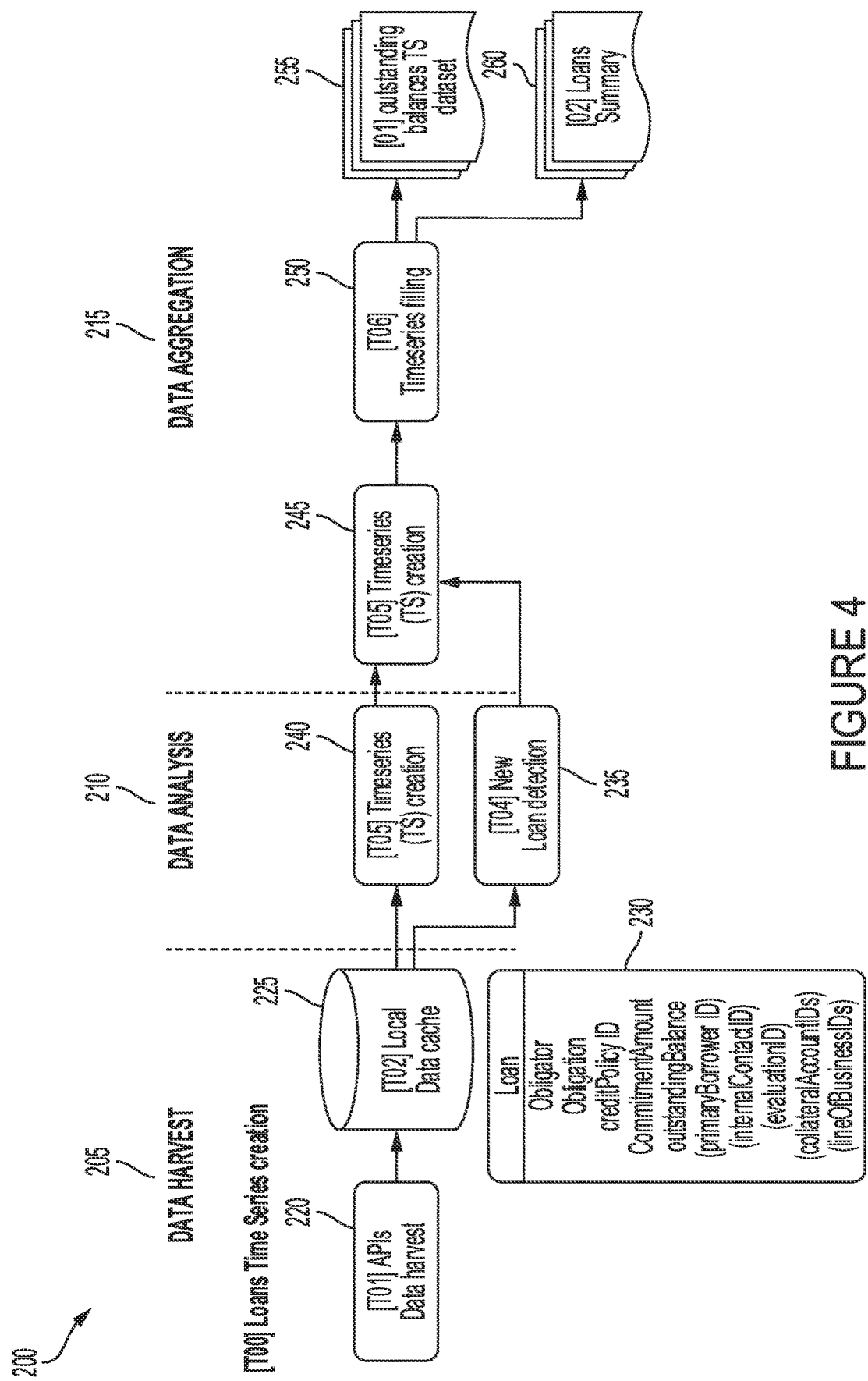
FIG. 4 is a flow diagram of a time-series extraction process data pipeline in accordance with one or more embodiments of the present disclosure.

FIG. 4 is a flow diagram of a time-series extraction process data pipeline 200 in accordance with one or more embodiments of the present disclosure. The time-series extraction process data pipeline 200 (e.g., the time-series extraction pipeline 22 of FIG. 1) may be configured to extract outstanding loan balances for the plurality of users that may be implemented in three steps: a data harvest step 205, a data analysis step 210, and a data aggregation step 215. The time-series extraction process data pipeline 200 may be used to generate outstanding balance time series and to collect user-specific information from the loans data pulled directly via an application programmable interface (API), for example. The time-series extraction pipeline may also be referred to herein as a first-type data pipeline.

In some embodiments, the data harvest step 205 may include the machine-learning processor 20 pulling data from the plurality of electronic resources 100A and 100B in a [T01] APIs data harvest step 220 via at least one API. The loan data 230 may be stored locally in the obligation-based data records 64 of the user-specific data object database 60 in a [T02] local data cache step 225. The loan data 230 may include an obligator, an obligation, a credit policy ID, a Commitment Amount Outstanding Balance that may further include a primaryBorrowerID, an internalContactID, an evaluationID, a CollateralAccountID, and a lineOfBusiness ID.

In some embodiments, the data analysis step 210 may include the machine-learning processor 20 assessing the new data quality in a [T03] Data Quality assessment step 240 by both manual and/or automated processes. In some embodiments, the machine-learning processor 20 may execute a [T04] New Loan Detection step 235 to detect new loans with respect to the last time that data was pulled in step 235.

In some embodiments, the data aggregation step 215 may include an outstanding balance time series (TS) creation [T05] step 245 in order to extract the history of each loan from our local data from the local data cache 225. In order to compute the outstanding value of a given loan for all days in a [T06] Timeseries filling step 250, the machine-learning processor 20 may fill missing values into many outstanding balance time series outputted from the time series (TS) creation [T05] step 245. The machine-learning processor 20 may interpolate data within missing data time intervals in the Timeseries filling step 250. This process may lead to two results for each loan: [O1] outstanding balances time series (TS) dataset for each loan [O1] 255 and [O2] a Loans Summary 260, or a summarized information about the loan itself [O2], which may include for each loan, the committed amount [O2] and other descriptive information such as, for example, a start and an end date for each loan.

In some embodiment, the system 10 may be configured to classify borrowers through the distribution of their assets. To represent a distribution, the machine-learning processor 20 may use a frequency count feature that may capture the portion of wealth allocated to a particular asset or category of asset. The machine-learning processor 20 may classify the portfolio composition by first considering two different aspects: (i) market value, and (ii) haircuts applied by financial institutions while offering a loan.

Figure 5:
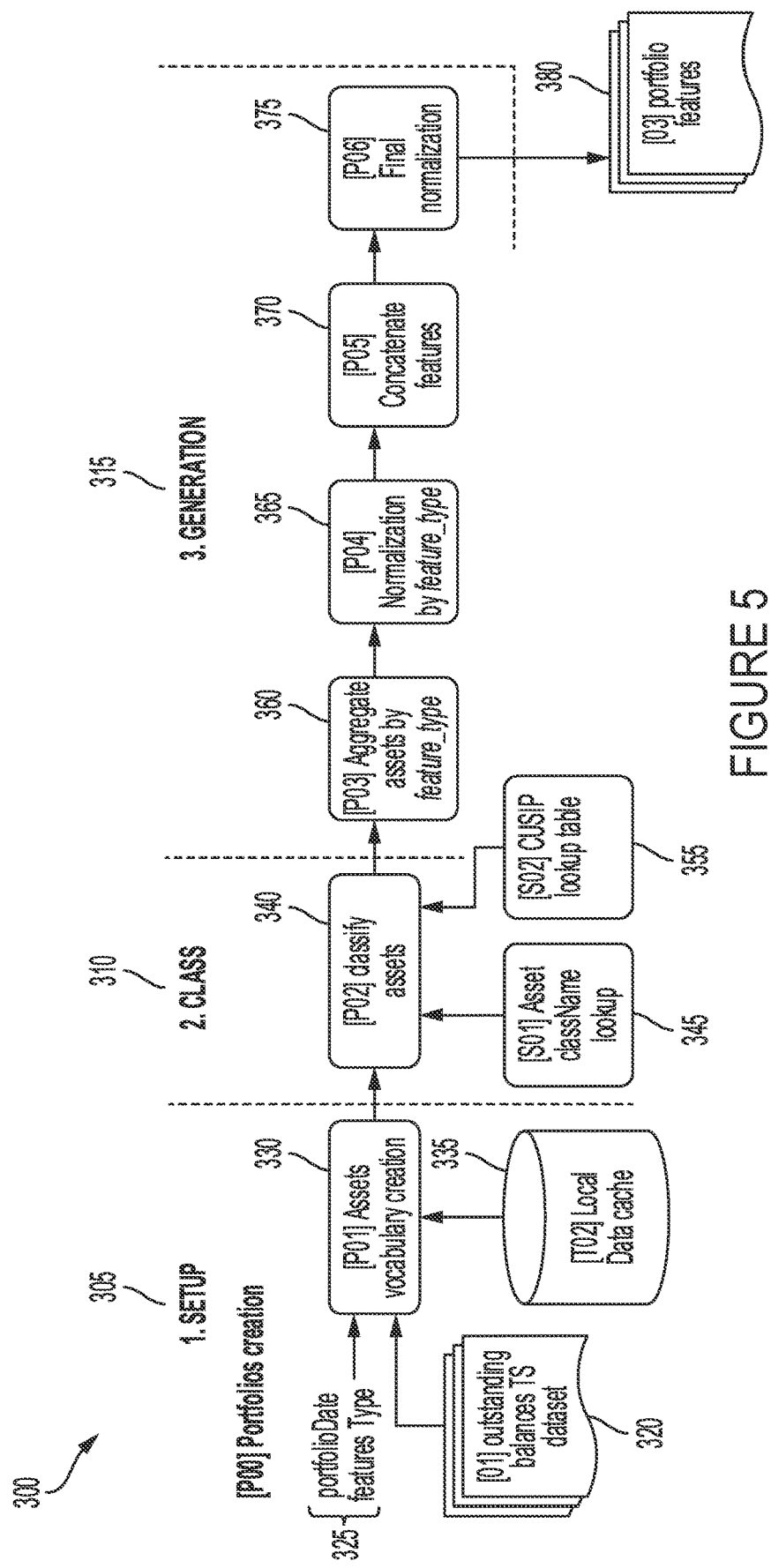
FIG. 5 is a flow diagram of a feature extraction data pipeline in accordance with one or more embodiments of the present disclosure.

FIG. 5 is a flow diagram of a feature extraction data pipeline 300 in accordance with one or more embodiments of the present disclosure. The feature extraction data pipeline 300 (e.g., the feature extraction pipeline 23 of FIG. 1) may include a setup phase 305, a classification phase 310, and a generation phase 315. The feature extraction data pipeline 300 may be used to generate portfolio features for training the machine learning model 24 using historical financial data of borrowers. The feature extraction pipeline may also be referred to herein as a second-type data pipeline.

In some embodiments, the machine-learning processor 20 may execute the feature extraction pipeline 23 (FIG. 1) or feature extraction data pipeline 300 of FIG. 5. In the setup phase 305, the machine-learning processor 20 may use as an input the dataset of [O1] outstanding balances time series dataset 320, a portfolio date/features type 325, and/or the historical financial data from the local data cache [T02] 335 into a [P01] Assets Vocabulary Creation module 330. In other embodiments, the machine-learning processor 20 may filter out from the borrower's financial data, all loans having less than 365 days of historical data. The [P01] Assets Vocabulary Creation module 330 may create a dictionary of all possible asset IDs within the financial data.

In some embodiments, the machine-learning processor 20, in the classification phase 310, may input an asset class name [S01] lookup table 345 and a Committee on Uniform Security Identification Procedures (CUSIP) code [S02] lookup table 355 into an Asset Hierarchical classification [P02] module 340. These lookup tables respectively describe the class and/or the sector that a given asset may belong to with three levels of granularity. This information may be attached to all loan data in the user-specific object database 60 so that each asset may be described in a very detailed fashion [P02].

In some embodiments, the machine-learning processor 20, in the generation phase 315, using an aggregation module 360 may aggregate assets by feature_type [P03] so as to split each portfolio (in terms of either market value or top up amount) according to different types of segmentation. The machine-learning processor 20 may consider the amount of each asset of the vocabulary generated by module 330 (i.e., [P01]), For each class in asset class name [S01] lookup table 345, the machine-learning processor 20 may use the total amount of assets belonging to that class. Each class then has two more granularity levels. For each sector in (CUSIP) code [S02] lookup table 355, the machine-learning processor 20 may use the total amount of assets belonging to that sector. Each sector then has two more granularity levels.

In some embodiments, for each portfolio and for each segmentation, the machine-learning processor 20 may generate a histogram representing how the portfolio may be composed in terms of the different categories of that specific segmentation type. In a normalization step 365 by feature_type [P04], each histogram may be normalized independently using L2-normalization. Each normalized histogram may represent a set of features. In a [P05] concatenation step 370, the set of features may be fused together or concatenated so as to generate a common features vector. In a [P06] final normalization step 375, each feature vector may be normalized independently through L2-normalization. The final result of the feature extraction data pipeline 300 is to generate a portfolio features dataset [O3] that may include the features of each portfolio that may be used to train the model.

Figure 6:
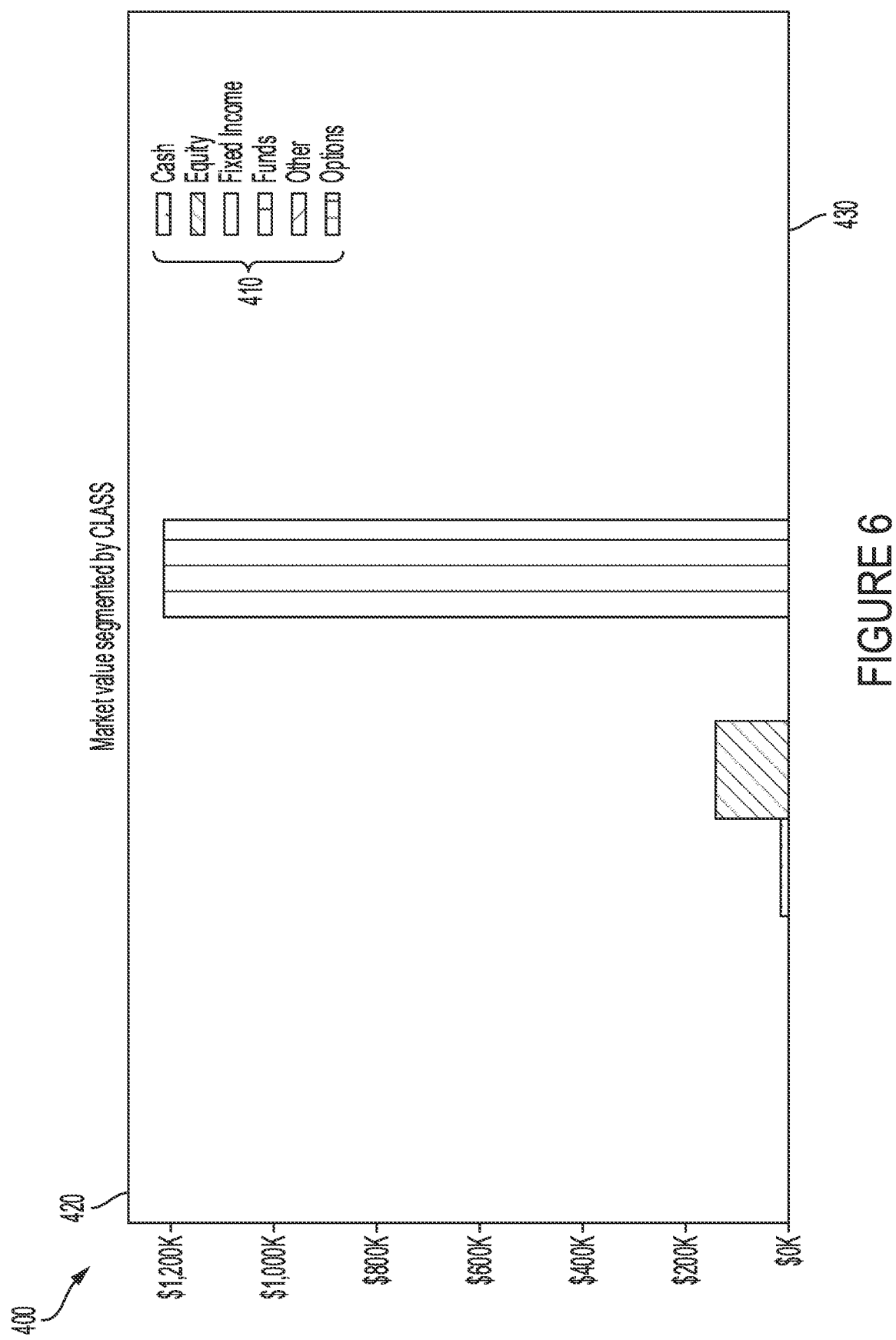
FIG. 6 is an exemplary histogram illustrating a total amount of portfolio assets split into asset classes versus each asset class in accordance with one or more embodiments of the present disclosure.

FIG. 6 is an exemplary histogram 400 illustrating a total amount of portfolio assets 420 split into asset classes 410 versus each asset class 430 in accordance with one or more embodiments of the present disclosure.

Figure 7:
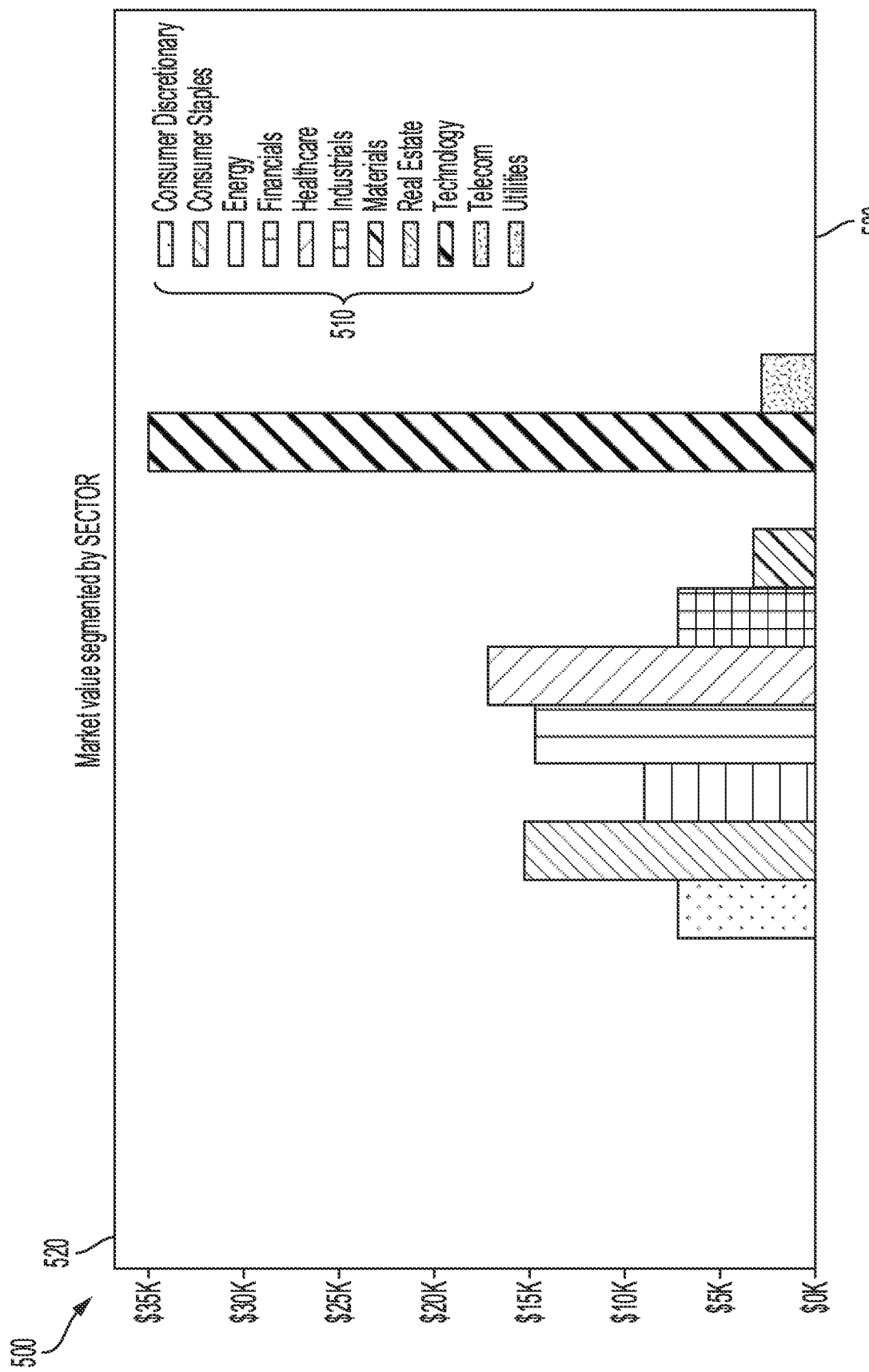
FIG. 7 is an exemplary histogram illustrating a total amount of portfolio assets split into sectors versus each sector in accordance with one or more embodiments of the present disclosure.

FIG. 7 is an exemplary histogram 500 illustrating a total amount of portfolio assets 520 split into sectors 510 versus each sector 530 in accordance with one or more embodiments of the present disclosure.

In some embodiments, there may be a correlation between the probability of moving the credit line and the portfolio composition of the borrower that is opening a new loan which may be incorporated into the machine learning model 24. Thus, the machine learning model 24 may be trained by using as training data, the portfolio corresponding to each loan. Since these parameters may change as a function of time, the machine-learning processor 20 may assess this correlation using the machine learning model 24 at the time at which the new credit line is opened.

Figure 8:
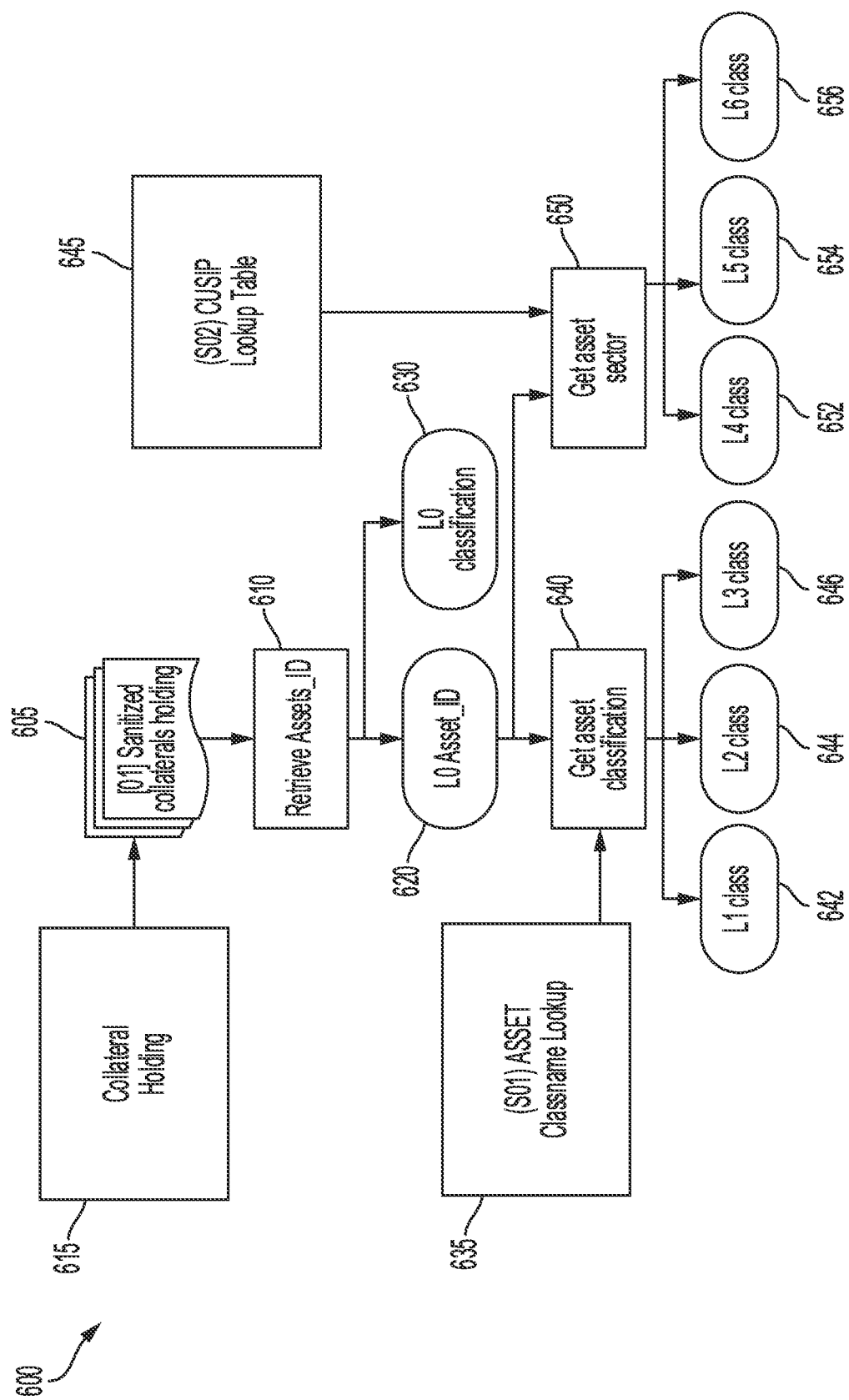
FIG. 8 is a flow diagram for classifying assets based on a number of attributes in accordance with one or more embodiments of the present disclosure.

FIG. 8 is a flow diagram 600 for classifying assets based on a number of attributes in accordance with one or more embodiments of the present disclosure. The machine-learning processor 20 may receive collateral holdings 615 of a user portfolio 65 and may [O1] sanitize the collateral holding in a step 605 to retrieve Assets_ID 610, or asset-based identifiers. The machine-learning processor 20 may further extract an L0 Asset_Id in a step 620 and an L0 classification in a step 630.

In some embodiments, the machine-learning processor 20 may use an [S01] asset className lookup table and the data from the steps 620 and 630 to get the asset classification in a step 640 of the user portfolio 65. The assets in the user portfolio 65 may be classified into an L1 asset class 624, an L2 asset class 644 and/or an L3 asset class 646. The L1 class 624 may include the asset main categories such as cash, equities, and funds, etc. The L2 class 644 may include asset subcategories such as Funds-ETFs, Fund-Bonds, Mutual-Funds, Cash, etc. The L3 class 646 may include Asset Sub-subcategories such as Cash-Calue Life Insurance, Cash-cash, Equity-Common shares, Equity-Convertible shares, Fund-US Equity Small Blend ETFs, etc.

In some embodiments, the machine-learning processor 20 may use an [S02] CUSIP lookup table 645 and the data from the steps 620 and 630 to get the asset sectors in a step 650 of the user portfolio 65. The assets in the user portfolio 65 may be classified into an L4 Sector 652, an L5 Sub-sector 654 and/or an L5 country 656. The L4 Sector 652 may include the asset main sectors such as Industrials, Consumer Staples, Utilities, etc. The L5 Sub-sector 654 may include asset subsectors such as the Aerospace industry, Airline, Agriculture, etc. The L5 country 656 may include USA, Brazil, Germany, etc.

Figure 9:
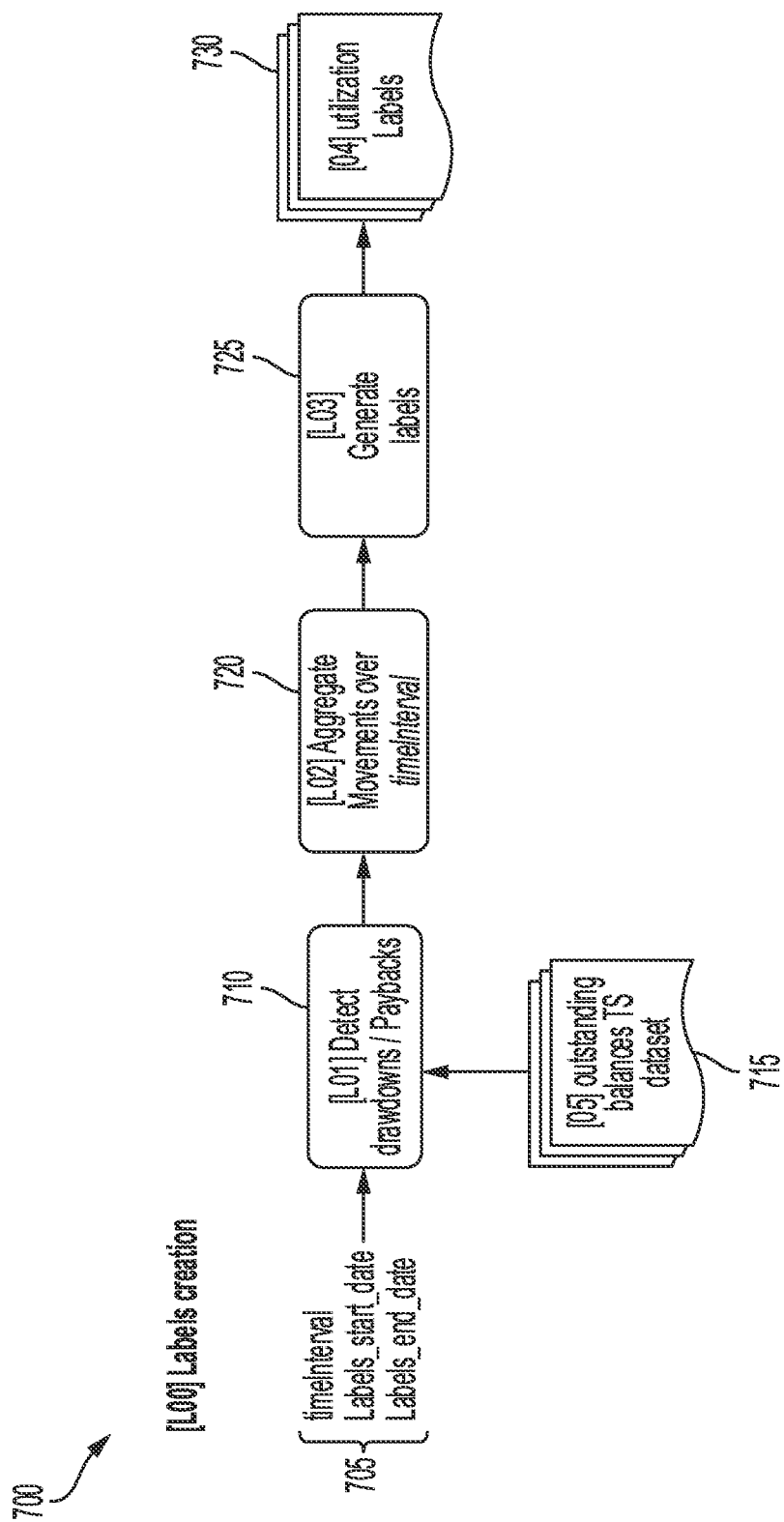
FIG. 9 is a flow diagram of a label creation data pipeline in accordance with one or more embodiments of the present disclosure.

FIG. 9 is a flow diagram 700 of a label creation data pipeline in accordance with one or more embodiments of the present disclosure. The [L00] label creation data pipeline may be used to generate utilization labels for use in training the machine learning model 24. In a first step in the label creation data pipeline may include detecting movements in the user portfolio 65. The machine-learning processor 20 may [L01] detect a number of movements such as drawdowns/paybacks in a step 710 from the user portfolio 65 for each outstanding balances time-series (TS) dataset 715 over a time interval 705 defined by Labels_start_date to Labels_end_date. The machine-learning processor 20 may detect the movements by computing a first order derivative of a given times-series. The machine-learning processor 20 may count the number of movements that may have occurred in the first 365 days of each time series [L02], for example.

In some embodiments, in a second step in the label creation data pipeline may include labels creation. The machine-learning processor 20 may [L03] generate a utilization label for each loan in the user portfolio 65 in a step 725 according to the number of movements occurring in the outstanding balance within the first 365 days, for example. If this number is greater than 0, then the label is 1, otherwise the label is 0. In a step 730, a [O4] Utilization Label is generated for each loan in the user portfolio 65 which may be added to the portfolio features vector for training the machine learning model 24.

In some embodiments, the time-series extraction pipeline 22 or a first-type data pipeline may include a label creation functionality as described in FIG. 9 to generate labeled loan data also referred to as user-specific activity engagement labeling data.

Figure 10:
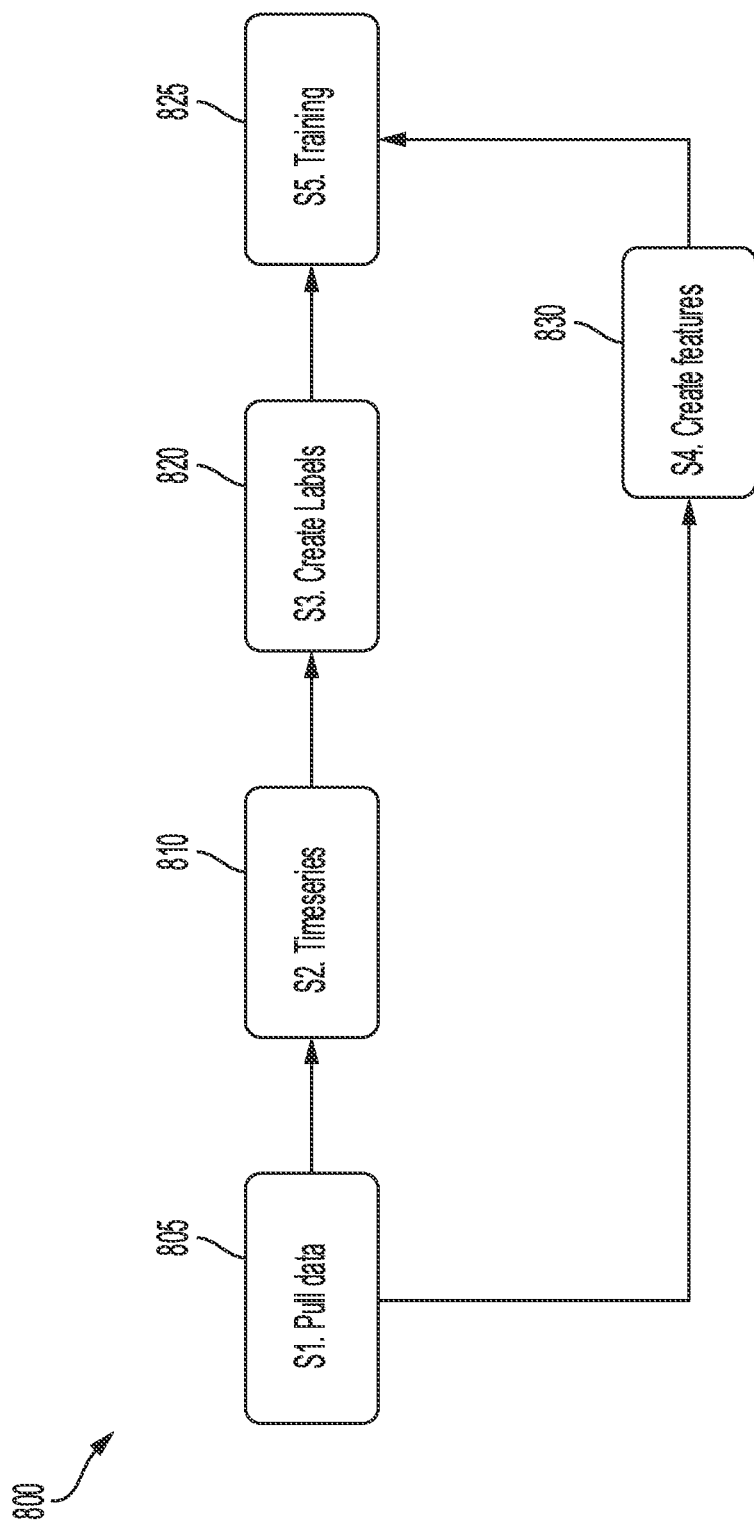
FIG. 10 is a flow diagram of a training data pipeline in accordance with one or more embodiments of the present disclosure.

FIG. 10 is a flow diagram 800 of a training data pipeline in accordance with one or more embodiments of the present disclosure. The training data pipeline may be used to create a model that is able to predict the utilization likelihood of a loan. In a step 805 denoted [S1] Pull Data, the machine-learning processor 20 may update the content of historical financial data for the plurality of users by locally pulling data via the Fastnet API. The machine-learning processor 20 may then execute two parallel processes: a label creation process and a features extraction process.

In some embodiments, the machine-learning processor 20 may build a [S2] time series of the outstanding balance of each loan [S2] in a step 810. According to the pattern of each time series, the machine-learning processor 20 may create a label [S3] in a step 820. In parallel in a step 830, the machine-learning processor 20 may create features from financial data of each portfolio [S4]. Once both features and labels for each loan have been generated, the machine-learning processor 20 may start training [S5] in a step 825 the machine learning model 24 to learn the relationship between the features and labels.

Figure 11:
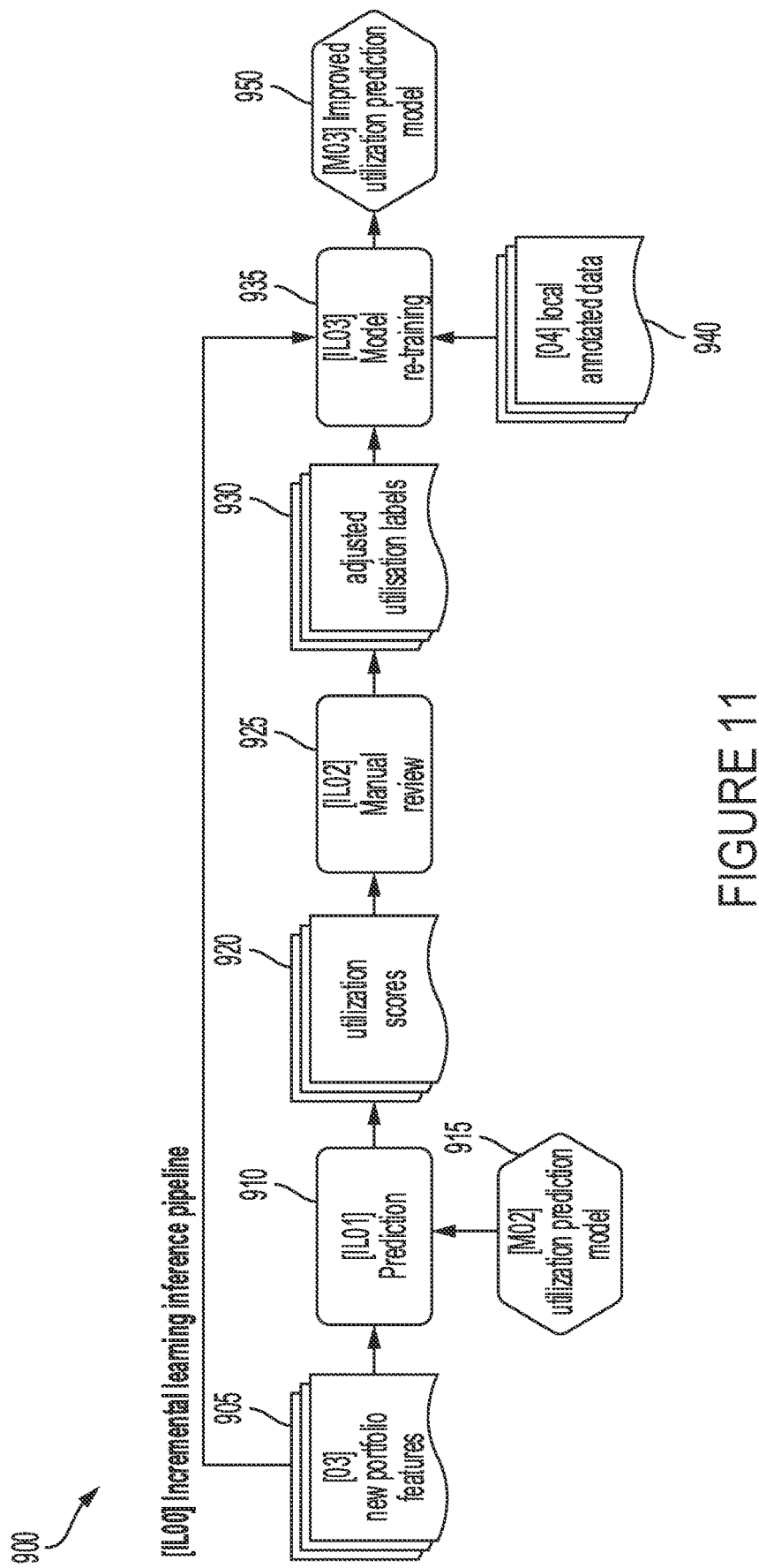
FIG. 11 is a flow diagram of an incremental learning inference data pipeline in accordance with one or more embodiments of the present disclosure.

FIG. 11 is a flow diagram 900 of an incremental learning inference data pipeline in accordance with one or more embodiments of the present disclosure. The incremental learning inference data pipeline (e.g., a third type of data pipeline) describes how the machine learning model 24 learns from the training dataset. Suppose that there is a [M02] trained machine learning model 515 deployed in a production environment. Periodically. the incremental learning inference data pipeline may receive [O3] new portfolio features 905 and may predict [IL01] the utilization likelihood for each of them as utilization scores 920.

In some embodiments, a user may perform a [IL02] manual review 925 of the processed portfolio to know if any of the predicted utilization labels were correct or not. If not correct, the predicted utilization labels that are incorrect may be adjusted in a step 930 and the model retrained [IL03] in a step 935. In this manner, new portfolio feature data [O3-O4] and local annotated data in step 940 may be used to retrain a better ML model [IL03] in the step 935. At this point the new model may be deployed and the process restarts, but with an improved utilization prediction model [M03] in a step 950.

In some embodiments, a Light Gradient Boosting (LightGBM) model may be used since it provides an interpretation of the output. In particular, once the model is trained, the model provides an understanding as to both which features are the most discriminative ones for the whole training dataset and which features are the most important ones to determine the output of each test sample at inference time.

In some embodiments, the LightGBM framework may support different machine learning algorithms including gradient boosted trees (GBT), gradient boosted decision trees (GBDT), gradient boosted regression trees (GBRT), gradient boosted machine (GBM), multiple additive regression trees (MART) and random forest (RF). LightGBM may use the advantages of Extreme Gradient Boosting (XGBoost), including sparse optimization, parallel training, multiple loss functions, regularization, bagging, and early stopping. A major difference between the LightGBM and XGBoost may be in the construction of trees. LightGBM does not provide a tree level-wise—row by row—as most other implementations do, but grows trees leaf-wise. It may choose the leaf yielding the largest decrease in loss. LightGBM may not use a sorted-based decision tree learning algorithm, which may search for the best split point on sorted feature values, as XGBoost or other implementations do. Instead, LightGBM may implement a highly optimized histogram-based decision tree learning algorithm, which may yield advantages on both in terms of computational efficiency and memory consumption. The LightGBM algorithm may utilize two novel techniques called Gradient-Based One-Side Sampling (GOSS) and Exclusive Feature Bundling (EFB) which may allow the algorithm to run faster while maintaining a high level of accuracy. LightGBM may operate on Linux, Windows, and macOS platforms and may support C++, Python, R, and C#.

Figure 12:
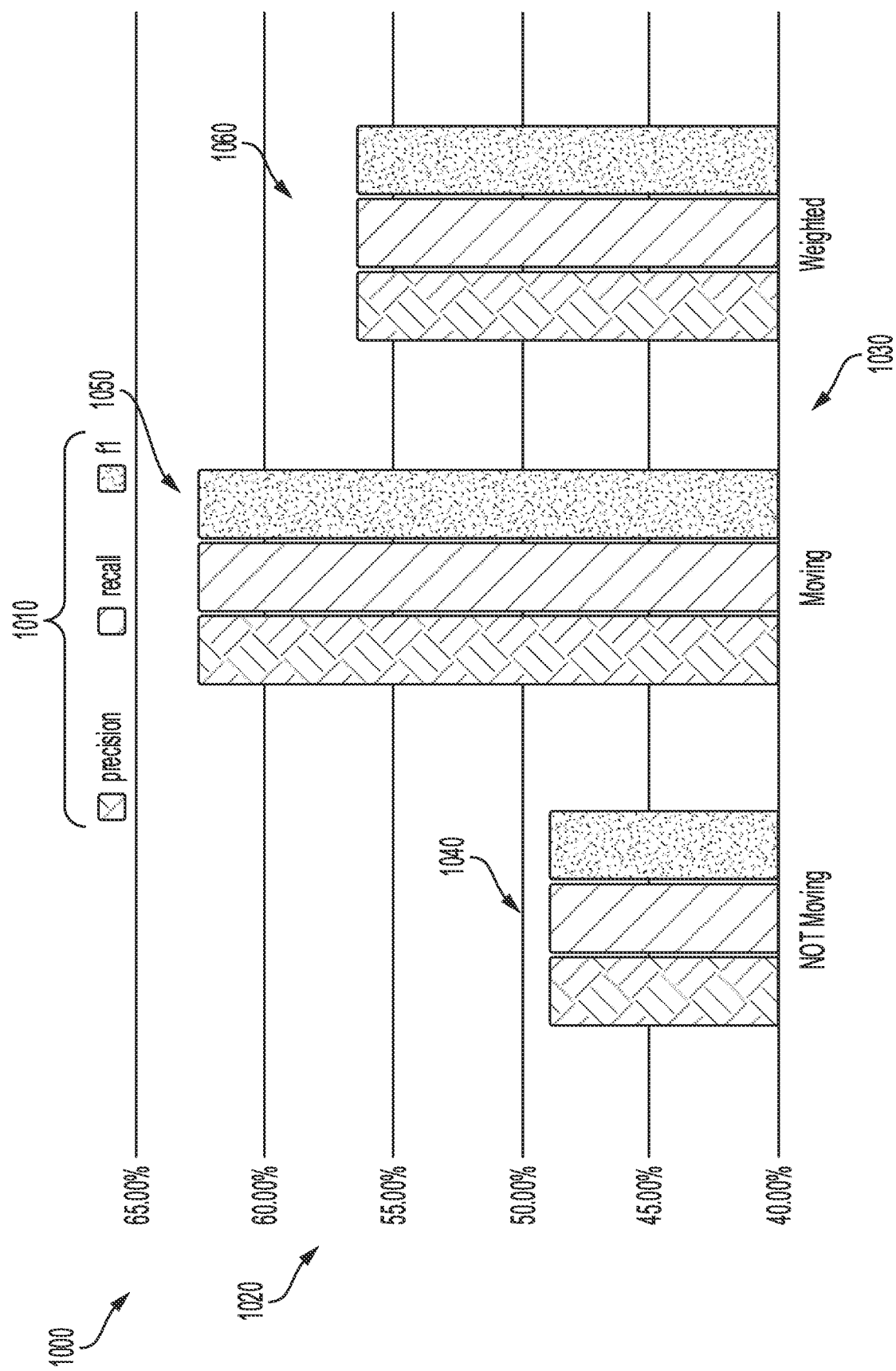
FIG. 12 is a first graph illustrating computational results in accordance with one or more embodiments of the present disclosure.

FIG. 12 is a first graph 1000 illustrating computational results in accordance with one or more embodiments of the present disclosure. The first graph 1000 illustrates the results for a first exemplary use case of single lead scoring. The first graph 1000 shows the results considering all loans in the test dataset. This accounts for a scenario in which there is a single lead and the system predicts how likely 1020 the single lead is going to move 1050 the credit line in the first 365 days from its hypothetical opening, not move the credit line 1040, or a weighted outcome 1060.

The first graph 1000 shows that for a given input lead (e.g., prospective customer), the machine learning (ML) model 24 may predict the likelihood that the lead will move the credit line during the first year after its opening. The first graph 1000 shows the performance of the ML model 24, in terms of precision, recall and f1 (as shown in a graph legend 1010), based on test set that include a set of loans to be used for training the ML model 24.

The first group may refer to the NOT Moving sample 1040, the second group to the Moving sample 1050, while the weighted group 1060 refers to the weighted average results between the two classes. For example, for the Moving class 1060, the precision of the Moving class is about 63%, such that for every 100 leads that the ML model 24 predicted will move the line of credit during the first year, 63 leads actually did. The recall of the Moving class 1060 is about 63%, such that for every 100 leads that will actually move the line of credit during the first year, the ML model 24 successfully detects 63 of them. The f1 is a trade-off metric between precision and recall and that may be typically used to summarize the overall performance of the ML model 24. Note that the Precision, Recall and f1 metrics are also shown for the NOT moving 1040 and Weighted Average 1060 classes.

Figure 13:
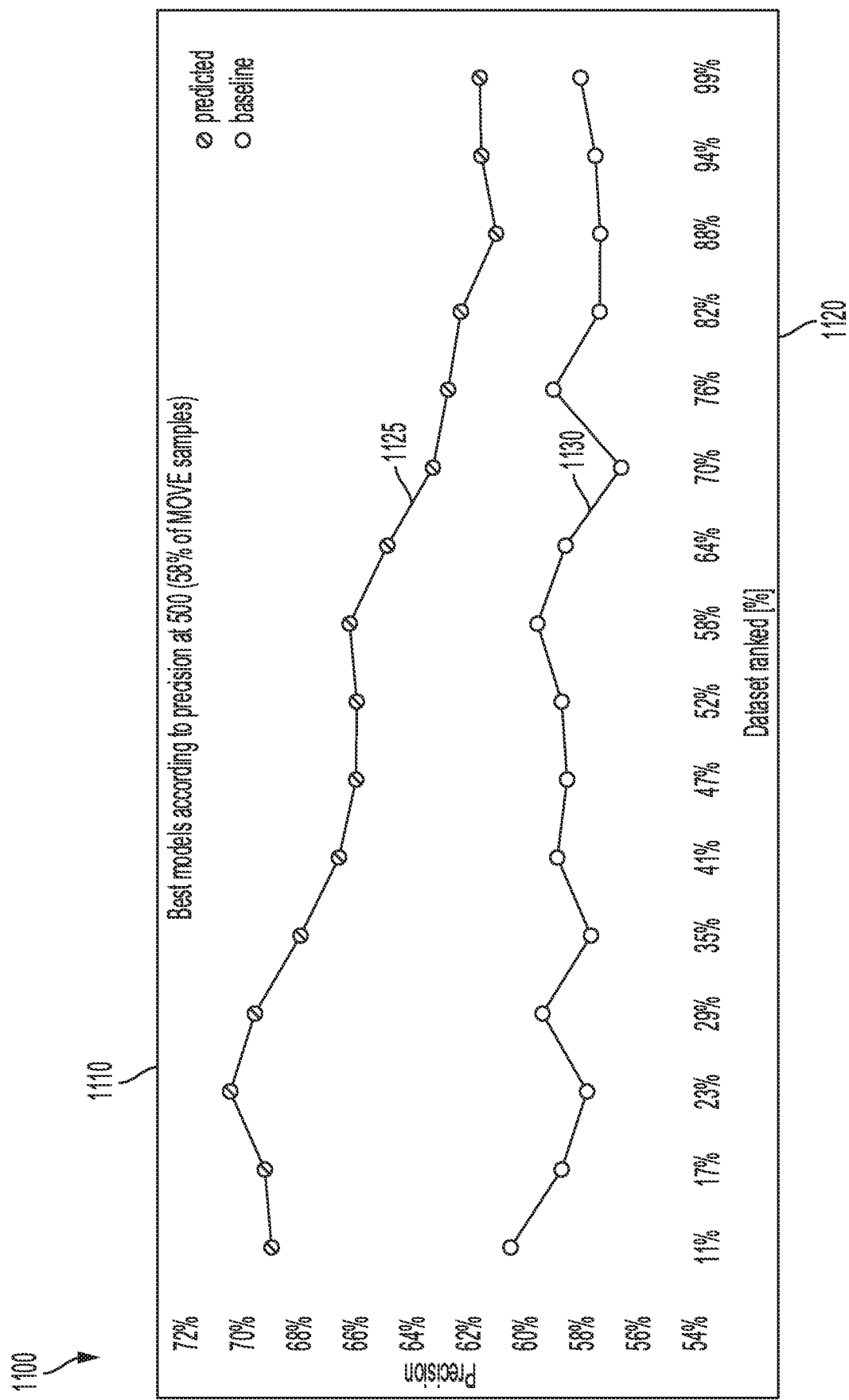
FIG. 13 is a second graph illustrating computational results in accordance with one or more embodiments of the present disclosure.

FIG. 13 is a second graph 1100 illustrating computational results in accordance with one or more embodiments of the present disclosure. In this case, the results may consider all loans in the test dataset but ranked 1120 by the prediction confidence score 1110. This is a representation of the scenario in which a financial advisor has a list of leads and has to decide which one that the financial advisor should start trying to convince to utilize the loan line of credit. The second graph 1100 shows predicted results 1125 and baseline results 1130.

The second graph 1100 describes the performances of the ML model 24 from a different perspective, that is to simulate the job of a financial advisor in selecting leads. The financial advisor may have, for example, a list of 100 possible leads. Without the ML model 24, the financial advisor may randomly choose the first possible lead to engage with. In some embodiments, using the ML model 24, the prediction outcome manager 26 may display to the financial advisor on the graphic user interface GUIP 92B, for example, a list of leads ranked by the probability of drawing down a loan.

The x-axis 1120 of the second graph 1100 may indicate the specific percentage of the training test set whose samples have been ranked by a descending probability of opening a credit line. The y-axis of the second graph 1100 may indicate the precision in percentage of the ML model 24 on that percentage of training test set. In order for the ML processor 20 to generate this chart, the training test set sample was ranked according to the predicted probability of moving the line of credit (in descending order). For example, when x is 11%, this refers to the first 11% of the test samples being considered. The corresponding precision of the ML model 24 may be computed, which is about 69% for a financial advisor using the ML model 24, while the precision may be only about 61% when the financial advisor does not use the ML model 24 (e.g., works alone).

Figure 14:
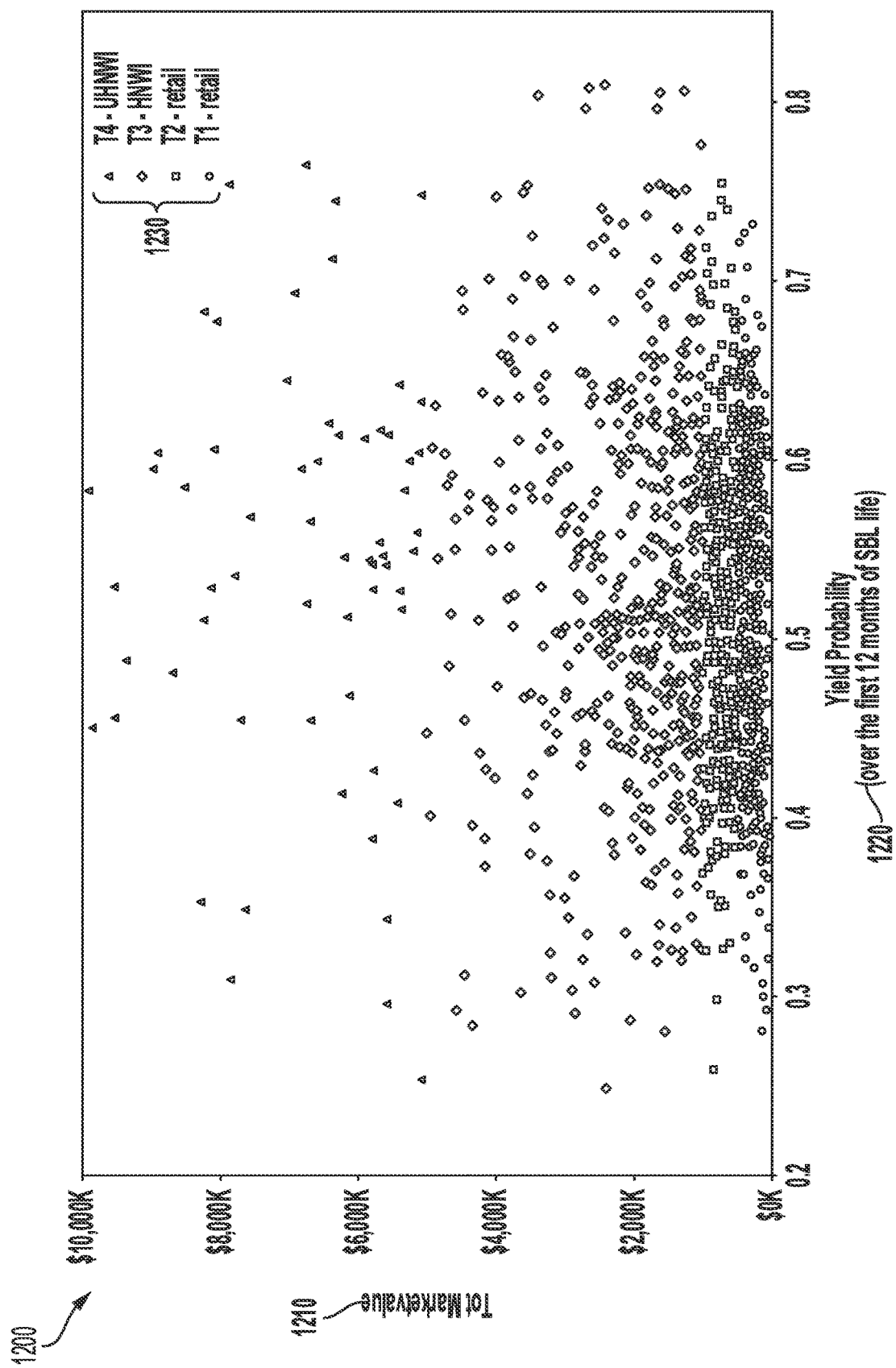
FIG. 14 is a third graph illustrating computational results in accordance with one or more embodiments of the present disclosure.

FIG. 14 is a third graph 1200 illustrating computational results in accordance with one or more embodiments of the present disclosure. The third graph 1200 illustrates a Total Portfolio Market Value 1210 versus a yield probability 1220 of generating revenue by users using a line of credit over the first 12 months of SBL life. A legend 1230 of the third graph 1200 shows data points for Ultra High Net Worth Individuals (UHNWI) T4, High Net Worth Individuals (HNWI) T3, a retail customer T2, and a retail customer T1. Each point on the third graph 1200 may be a sample lead in the test set. The x-axis 1220 may indicate the probability that a given lead may fall into that line, such that the lead may move the line of credit during its first 12 months so as to generate yield. The y-axis 1210 is the total market value of each lead. The Total market value may be split in 4 value-based categories 1230, each of which represents a particular client segment such as ultra-high net worth individual (UHNWI), high net worth individual (HNWI), etc.

Figure 15:
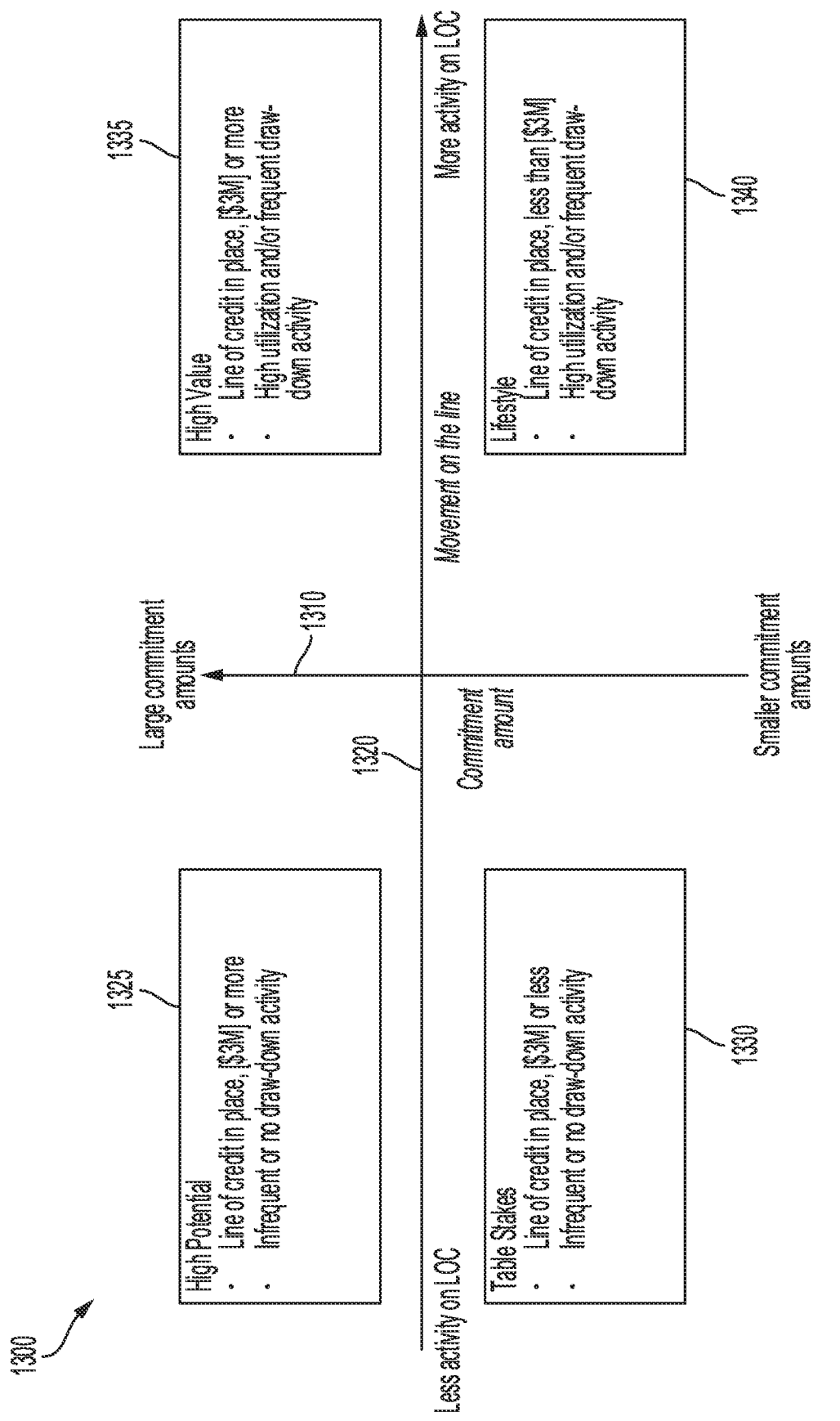
FIG. 15 is a graph illustrating a potential usage of a line of credit in accordance with one or more embodiments of the present disclosure.

FIG. 15 is a graph 1300 illustrating a potential usage of a line of credit in accordance with one or more embodiments of the present disclosure. The graph 1300 plots a commitment amount 1310, such as how much potential LOC usage that a user will use from a given line of credit LOC, as a function of portfolio movements 1320 of the user. The graph 1300 indicates a labeling of users, such as a user of high potential 1325 for using the LOC of $3 million or more, for example, even though the user exhibits no-draw-down activity of the user's portfolio, a user of high value 1335 for using the LOC of $3 million or more, for example, with the user exhibits high utilization and/or frequent draw-down activity of the user's portfolio, a user of table stakes 1330 for using the LOC of $3 million or less, for example, and where the user exhibits no-draw-down activity of the user's portfolio, and a user of lifestyle 1340 for using the LOC of $3 Tnillion or less, for example, and where the user exhibits high utilization and/or frequent draw-down activity of the user's portfolio. The machine learning model 24 is configured to capture these parametric trends. A financial advisor should target a user that exhibits high utilization and/or frequent draw-down activity of the user's portfolio and may be able to handle a larger LOC. Not shown in the graph 1300 is where the user is determined not eligible to be offered an SBL Loan. FIG. 15 refers to a line of credit of $3 million, which is by way of example and not by limitation of the embodiments disclosed herein. Any suitable value of a line of credit (LOC) may be given to the user based on the disclosed methods.

Figure 16:
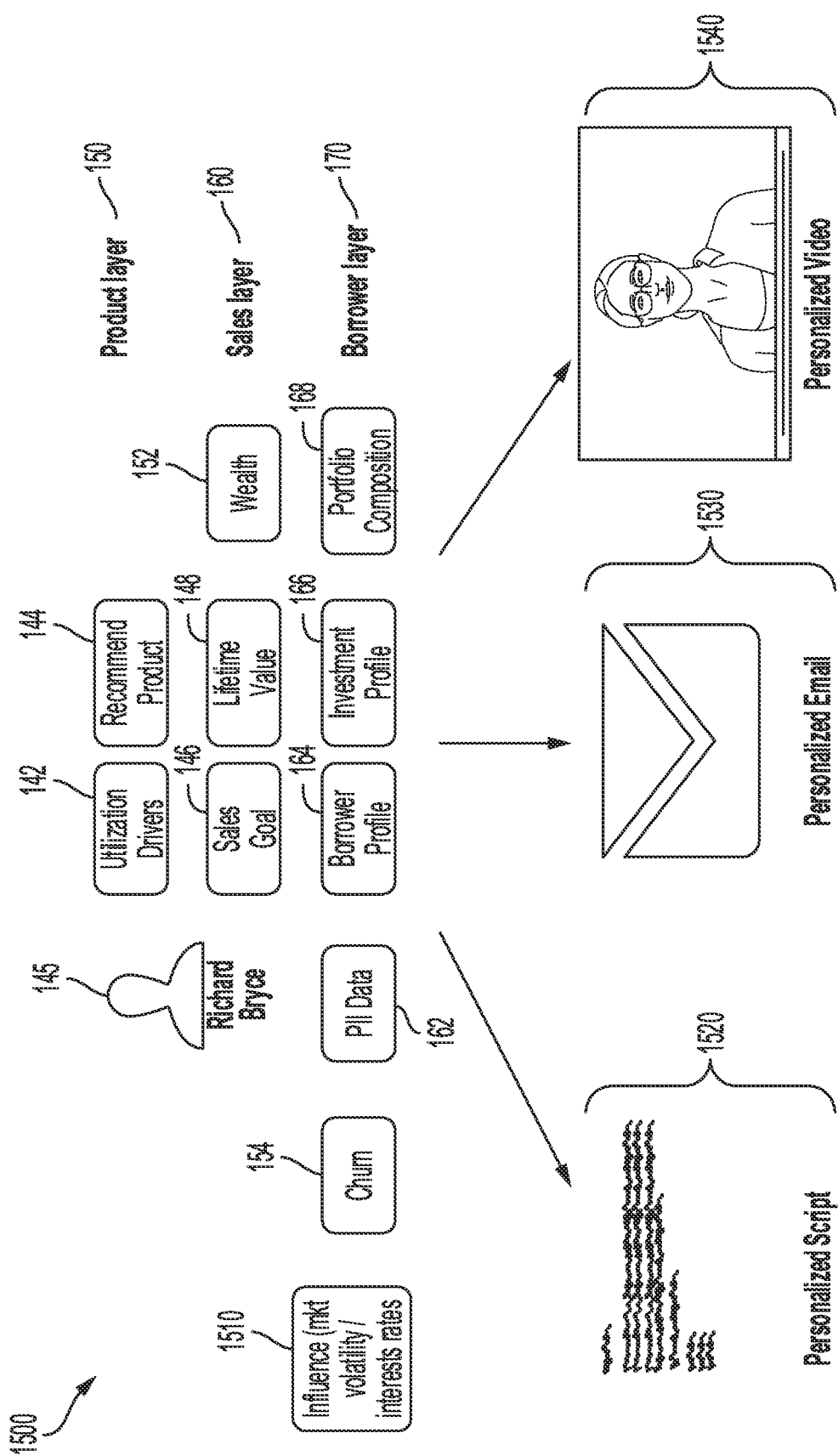
FIG. 16 is an exemplary output on a graphical user interface in accordance with one or more embodiments of the present disclosure.

FIG. 16 is an exemplary output 1500 on graphical user interface 92A or 92B in accordance with one or more embodiments of the present disclosure. When the financial advisor 85A or 85B (e.g., the entity-user) on any of the P computing devices 90A or 90B via GUI1 92A or GUIP 92B runs at least one user for the system 10 to determine whether or not to grant the at the least one user an SBL LOC, the financial advisor may receive the an exemplary output 1500 in GUI 92A or 92B as shown in FIG. 16. The exemplary output 1500 may display the same set of data attributes 140 for the at least one user (in this exemplary case for Richard Bryce 145) as shown in FIG. 3 as well as an assessment 1510 of an influence of market volatility and/or interest rates on the user's portfolio value.

In some embodiments, the financial advisor run the algorithms for a single user 80A or 80B such as during a face-to-face meeting, for example, as shown in FIG. 1. In other embodiments, the financial advisor may run the algorithms on a plurality of users and receive a ranked list of the plurality of users with a prediction utilization score for assessing whether each of the plurality of users may use the SBL line of credit.

In some embodiments, the exemplary output 1500 may include a financial advisor marketing kit such system 10 may provide the financial advisor with a personalized script 1520, a personalized e-mail 1530 and/or a personalized video 1540 with suggested user-customer communication for a specific user from the at least one user.

In some embodiments, the model (e.g., the machine learning model 24) may be executed by the machine-learning processor 20 as either a micro service or an API. Regardless, the model will receive as an input, a composition of the portfolio 65 a potential user (e.g., customer), which will generate user-specific features and predict how likely an SBL credit line corresponding to the portfolio 65 will be moved or used in the first 365 days from its opening.

In some embodiments, the machine-learning processor 20 may receive a plurality of portfolios of a plurality of users (e.g., client data gathering), determine SBL qualification for each of the plurality of users respectively based on each of their portfolios, use the model (e.g., the machine learning model 24) to determine projected utilization and LTV ranking, and the provide actionable rankings on the GUI 92A and 92B for the financial advisors.

In some embodiments, training the machine learning model 24 may include the machine-learning processor 20 generating a dataset of input and output vectors of data from the plurality of user that may include the model input data, data features, and output data as classified below in Tables I, II, and III. During training, the input and output vectors may be applied to the input and the output of the machine learning model 24 to train the machine learning model 24.

In some embodiments, Table I is a list of exemplary model inputs as shown below.

TABLE I

| Exemplary Model Inputs |
|---|
| Exemplary Model Inputs |
| Account Name |
| Account Registration |
| Income |
| Net Worth |
| Employment Status |
| Employment Tenure |
| Education |
| Investment Portfolio Details |
| Investment Portfolio Transactions |
| Previous Marketing Campaign Results |
| CRM interactions |
| Cash Balance |
| Credit History |
| Homeowner Status |
| Referring Advisor Code |
| Referring Financial Institution |
| Existing Customer Y/N |

In some embodiments, Table II is a list of exemplary data features as shown below.

TABLE II

| Exemplary Data Features |
|---|
| Exemplary Data Features: |
| Date |
|   year: Year. |
|   quarter: Quarter. |
|   month: Month. |
|   week_of_year: Week of year. |
| Tenure |
|   days_since_loan_started: Days since the loan started. |
|   months_since_loan_started: Months since the loan started. |

TABLE II-continued

Exemplary Data Features
Exemplary Data Features:

Outstanding balance
  outstanding_balance: Outstanding balance.
  days_with_positive_os_qty: Quantity of days with positive outstanding balance during the entire length of the loan.
  days_with_positive_os_ratio: Quantity of days with positive outstanding balance during the entire length of the loan over the quantity of days since the loan started.
  days_since_os_zero_qty: Quantity of consecutive days with the outstanding balance been zero.
  Days_since_os_positive_qty: Quantity of consecutive days with the outstanding balance been positive
Drawdowns
  drawdowns_qty: Quantity of drawdowns.
  drawdowns_amount_sum: Total amount of money drawdowned.
  days_until_first_drawdown: Quantity of days elapsed when the first drawdown occurred.
  first_drawdown_amount: Amount of money drawdowned in the first drawdown.
  first_drawdown_commitment_ratio: Amount of money drawdowned in the first drawdown over the commitment amount available.
days_since_last_drawdown: How many days have elapsed since the last drawdown . . .
Payments
  payments_qty: Quantity of payments.
  payments_amount_sum: Total amount of money paid.
  drawdowns_amount_paid_ratio: Total amount of money drawdowned that was already paid.
Alerts
  Is_on_top_up_alert: Boolean value that indicates if the loan has an open top up alert.
  Is_on_sell_out_alert: Boolean value that indicates if the loan has an open sell out alert.
  Is_on_margin_alert: Boolean value that indicates if the loan has an open margin alert.
  days_since_top_up_alert_opened_qty: Quantity of days elapsed with an open top up alert.
  days_since_sell_out_alert_opened_qty: Quantity of days elapsed with an open sell out alert.
  top_up_alerts_opened_qty: Quantity of top up alerts opened during the entire length of the loan.
  sell_out_alerts_opened_qty: Quantity of sell out alerts opened during the entire length of the loan.
  margin_alerts_opened_qty: Quantity of margin alerts opened during the entire length of the loan.
  top_up_alerts_days_qty: Quantity of days with an open top up alert during the entire length of the loan.
  sell_out_alerts_days_qty: Quantity of days with an open sell out alert during the entire length of the loan.
  margin_alerts_days_qty: Quantity of days with an open margin alert during the entire length of the loan.
Portfolio
  Percentage equity - percentage of portfolio in equities
  Percentage fixed income - percentage of portfolio in fixed income
  Percentage MF- percentage of portfolio in mutual funds
  Percentage ETF - percentage of portfolio in etfs
  percentage alternatives - percentage of portfolio in alternatives
  MV change 3 months - change in portfolio ($ value) over the last 3 months
  MV change 1 months- change in portfolio ($ value) over the last 1 months
  MV change 6 months - change in portfolio ($ value) over the last 6 months
  Total MV - $ portfolio is worth
  Advisor code - code of the advisor
  Advisor institution - institution of the advisor
  Custodian - custodian of the account In some embodiments, Table III is a list of exemplary outputs as shown below.

TABLE III

Exemplary Outputs
Exemplary Outputs

Client Number
Account Number
Propensity to Utilize Loan
Propensity to Initiate Loan
Propensity to Churn in 3 months

TABLE III-continued

Exemplary Outputs
Exemplary Outputs

Figure 17:
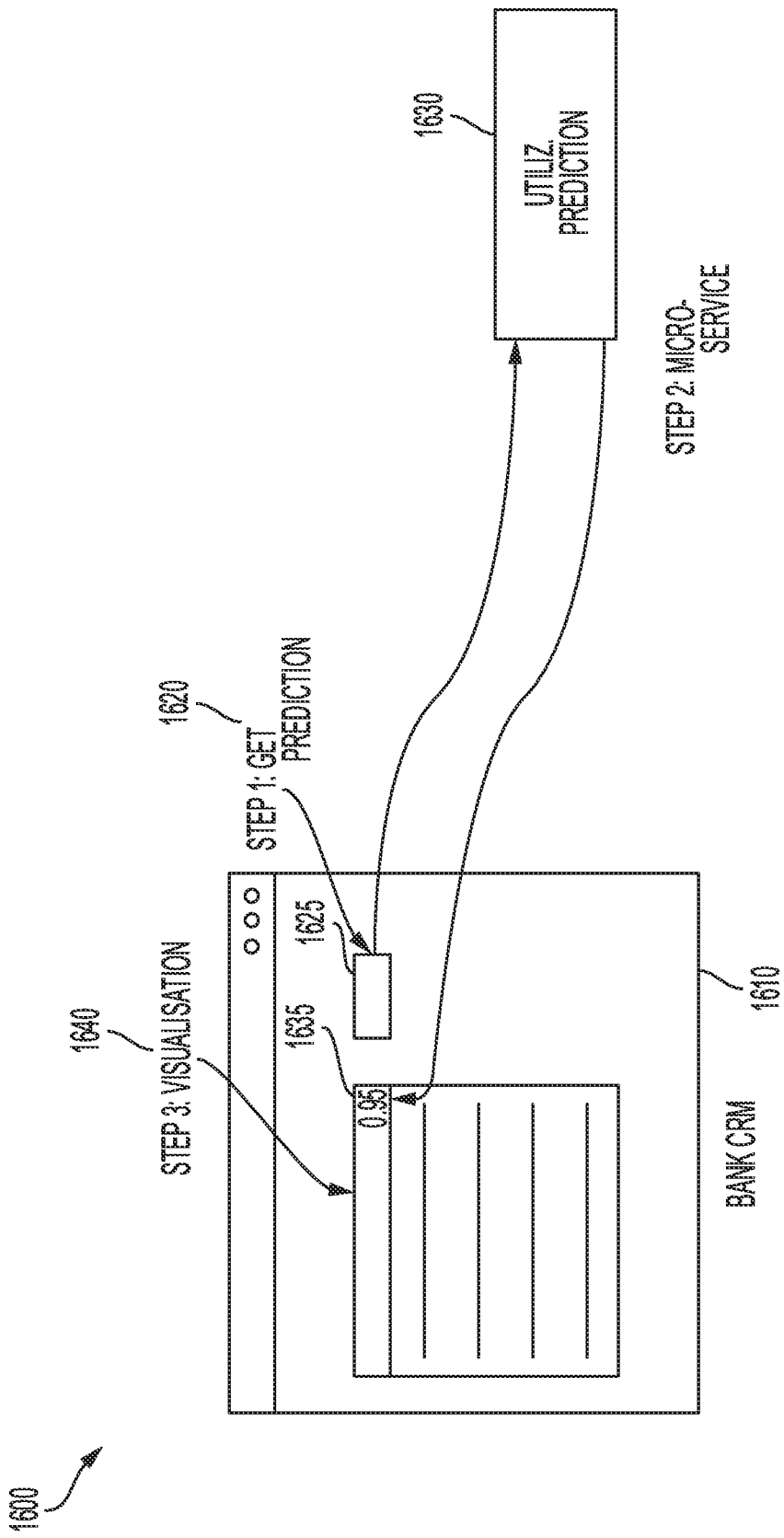
FIG. 17 is a flow diagram of a pull single lead scoring in accordance with one or more embodiments of the present disclosure.

Propensity to Churn in 6 months
Propensity to Churn in 9 months
Propensity to Churn in 12 months
Propensity to migrate segments
Model factors expressed as data features and % importance for each propensity measure FIG. 17 is a flow diagram 1600 of a pull single lead scoring in accordance with one or more embodiments of the present disclosure. In a first step 1620, any of the P the computing device processors such as the processor1 or the processorP 91A or 91B of a financial advisor via GUI1 92A or GUIP 92B operating banking customer relationship management (CRM) software (e.g., user 80A or 80B) may request to the machine-learning processor 20 over the communication network 30 to receive from the prediction outcome manager 26 a utilization prediction 1630 for the single user. In step 2 via a microservice, the machine-learning processor 20 may receive user-specific financial data from databases and electronic resources which may be input to the machine learning model 24 to receive a utilization prediction 1630 of a SBL line of credit for the single user. The utilization prediction may be outputted to the GUI1 92A or GUIP 92B for the financial advisor to view as in Step 3 1640. In this scenario, each of the computing devices may be a separate bank and the user-specific financial data may be relayed to the server 15 over the communication network 30 for determination of the utilization prediction score. In other embodiments, the processes shown in the flow diagram 1600 may be performed on the server 15 with all of the user-specific financial data for the single user stored in the user specific data object database 60.

Figure 18:
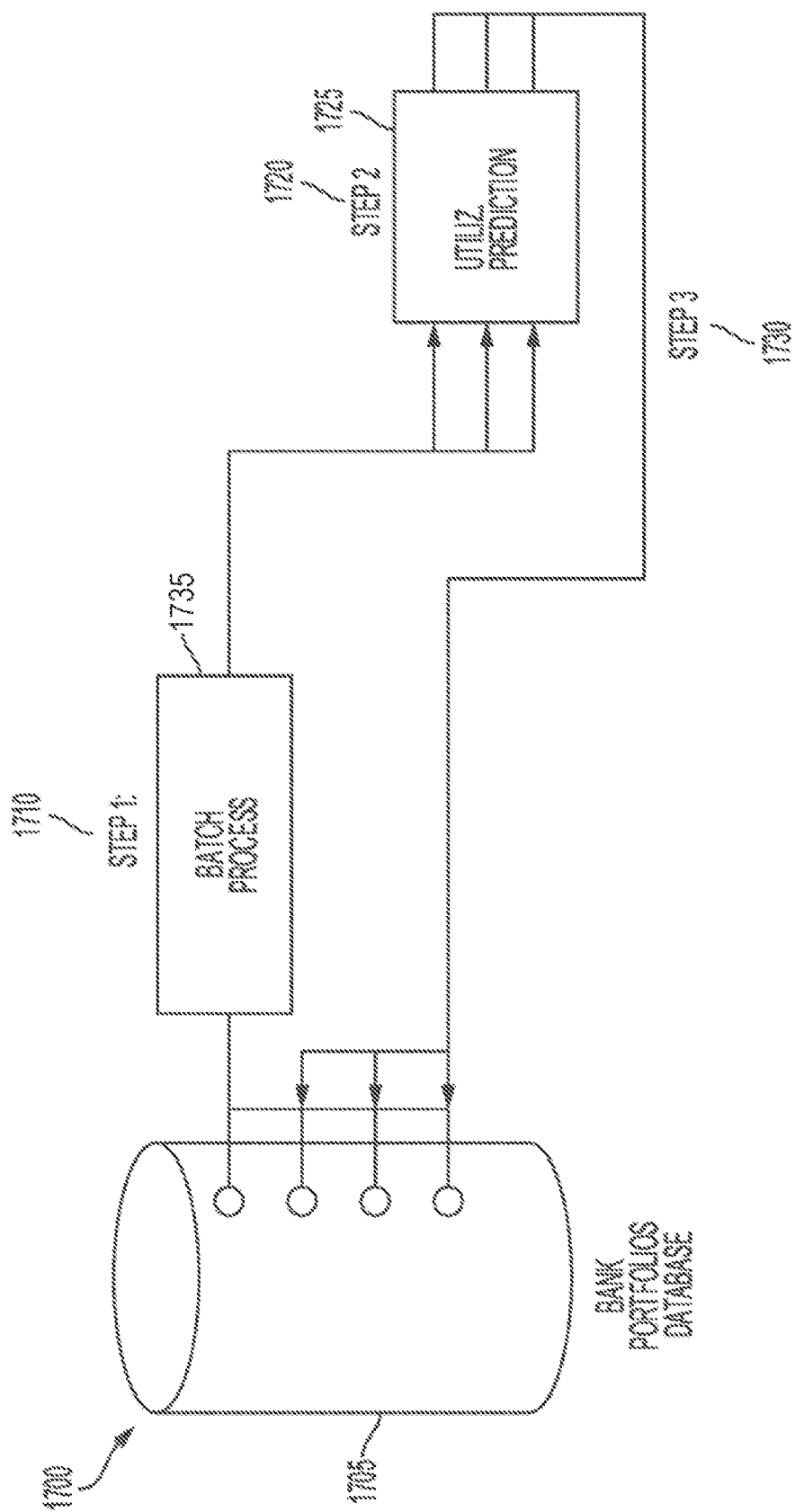
FIG. 18 is a flow diagram for scoring a batch process of leads in accordance with one or more embodiments of the present disclosure.

FIG. 18 is a flow diagram 1700 for scoring a batch process of leads in accordance with one or more embodiments of the present disclosure. In some embodiments, a bank portfolios database 1705 (e.g., such as any of the N user portfolios 65 or 75) may be stored in any of the P memories 93A or 93B on any of the P computing devices 90A or 90B. In other embodiments, the bank portfolios database 1705 may be stored in the memory 45 of the server 15. In a first step 1710, a plurality of portfolios of a respective plurality of users may be input in a batch process 1735 to the machine learning model in a second 1720 that outputs a utilization prediction score 1725 for each of the plurality of users. In a third step 1730, the bank porfolios database 1705 may be updated with the utilization prediction score 1725 for each of the plurality of users.

In some embodiments, the utilization prediction score 1725 for each of the plurality of users may be ranked and a ranked list may be displayed to a financial advisor on any of the P graphical user interfaces (e.g., GUI1 92A, GUIP 92B in FIG. 1).

Figure 19:
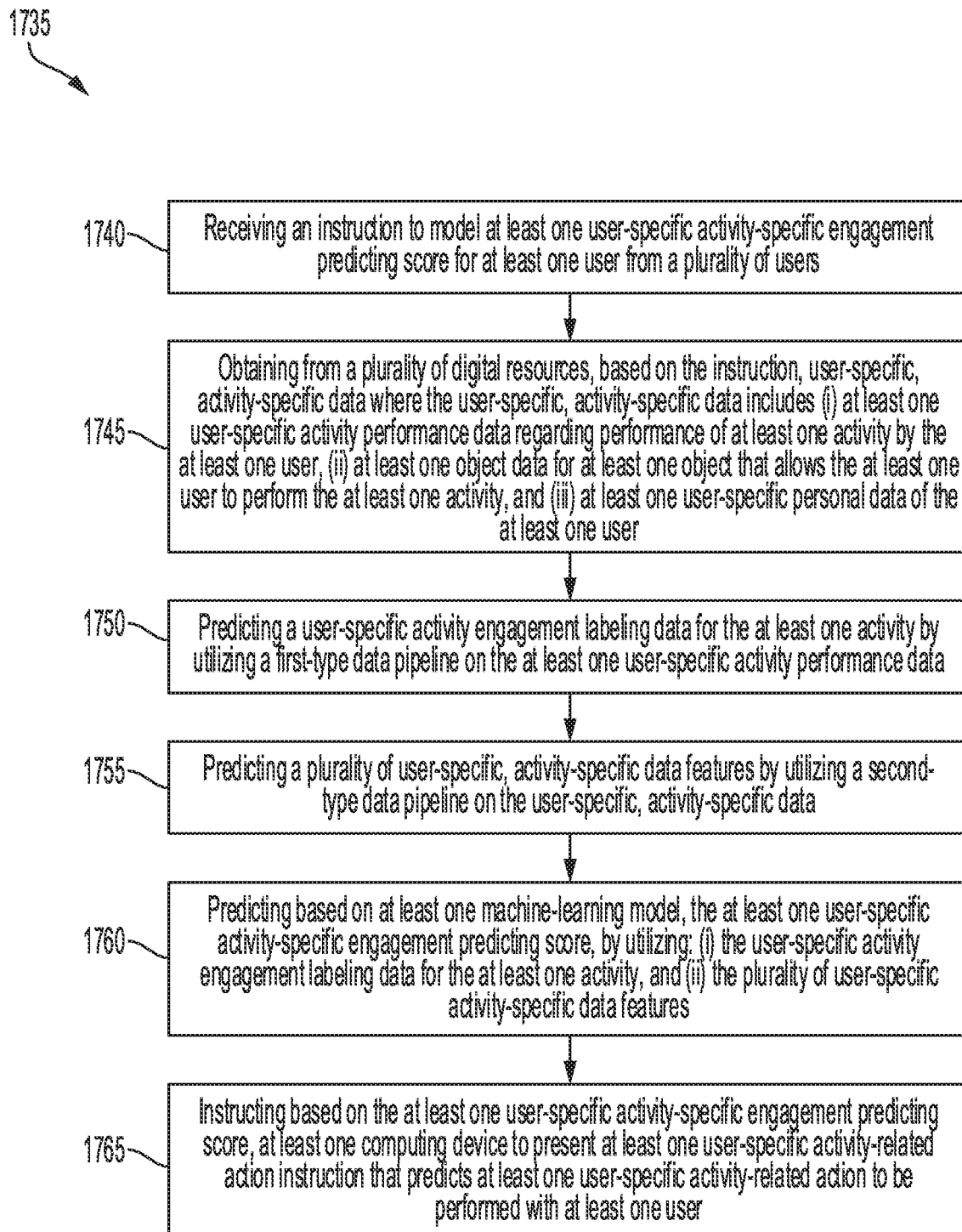
FIG. 19 is a flowchart of an exemplary method for modeling user-specific, activity-specific engagement predicting scores in accordance with one or more embodiments of the present disclosure.

FIG. 19 is a is a flowchart of an exemplary method 1735 for modeling user-specific, activity-specific engagement predicting scores in accordance with one or more embodiments of the present disclosure. The method 1735 may be performed by the machine-learning processor 20.

The method 1735 may include receiving 1740 an instruction to model at least one user-specific activity-specific engagement predicting score for at least one user from a plurality of users.

In some embodiments, the instruction, for example, may be an electronic request from a financial advisor using GUI1 92A or GUIP 92B over the communication network 30 for the server 15 to model at least one user-specific activity-specific engagement predicting score. The term "at least one user-specific activity-specific engagement predicting score" is synonymous and equivalent to the prediction utilization score that is the likelihood that the at least one user will use a line of credit as described herein above. In other embodiments, the prediction utilization score may include the likelihood that the at least one user will churn the line of credit with a higher score indicating a higher probability of user churning, and a lower score indicate a lower probability of user churning. The computation and/or modeling of the at least one user-specific activity-specific engagement predicting score is the performed by the machine learning processor 20 by applying the time-series extraction pipeline 22 and features extraction pipeline 23 to the user-specific, activity specific data.

In some embodiments, a first algorithm may be used for computing a first prediction utilization score that is the likelihood that the at least one user will use a line of credit. Likewise, a second algorithm may be used for computing a second prediction utilization score that is the likelihood that the at least one user will churn the line of credit. The first and second algorithms may be separate, independent, and/or decoupled from one another.

The user-specific, activity specific data may be financial data (e.g., both assets and/or debts), and/or personal data (age, gender, demographic attributes, psychographic attributes, and/or behavioral attributes) obtained from any of the digital resources and/or provided directly from the at least one user. Note that the terms digital resources and electronic resources may be used interchangeably herein and examples are provided as described herein above.

The method 1735 may include obtaining 1745 from a plurality of digital resources, based on the instruction, user-specific, activity-specific data where the user-specific, activity-specific data includes (i) at least one user-specific activity performance data regarding performance of at least one activity by the at least one user, (ii) at least one object data for at least one object that allows the at least one user to perform the at least one activity, and (iii) at least one user-specific personal data of the at least one user.

In some embodiments, at least one user-specific activity performance data regarding performance of at least one activity by the at least one user may be, for example, historical data regarding loans (types, balances) and/or lines of credit (types, balances) provided to the user. The performance of the at least one activity may refer to historical data regarding the number of movements, and/or churning of loans and/or lines of credit made by the user.

In some embodiments, at least one object data for at least one object that allows the at least one user to perform the at least one activity may refer to the current and/or historical data of accounts and/or securities (e.g., balances, and/or transactions), for example, held in the user portfolio 75 that allows the user (e.g., by providing collateral for the user) to perform the at least one activity regarding movements and/or churning of old and/or new lines of credit.

In some embodiments, the at least one object of the at least one user may be the data object 70 unique to a particular Nth user from a plurality of users that stores data, such as in data records, for example, such as user debts, loans, and/or line of credit stored in obligation-based data record, asset-based data records 75 (such as the Nth user portfolio 75, and user-specific personal data (e.g., PII, age, gender, demographic attributes, psychographic attributes, and/or behavioral attributes).

The method 1735 may include predicting 1750 a user-specific activity engagement labeling data for the at least one activity by utilizing a first-type data pipeline on the at least one user-specific activity performance data.

In some embodiments, the user-specific activity engagement labeling data may the data from outstanding balances TS dataset 255 and the loans summary 260 outputted from time-series extraction process data pipeline 200 (e.g., the first-type data pipeline) which may be then labeled as described in the label creation flow diagram 700. In other embodiments, the processes of the label creation flow diagram 700 may be integrated directly or may be a part of the first-type data pipeline.

The method 1735 may include predicting 1755 a plurality of user-specific, activity-specific data features by utilizing a second-type data pipeline on the user-specific, activity-specific data.

In some embodiments, the user-specific, activity-specific data may be inputting into the feature extraction data pipeline 300 (e.g., the second-type data pipeline) which may output the plurality of user-specific, activity-specific data features as shown for example in Table II.

The method 1735 may include predicting 1760 based on at least one machine-learning model, the at least one user-specific activity-specific engagement predicting score, by utilizing: (i) the user-specific activity engagement labeling data for the at least one activity, and (ii) the plurality of user-specific, activity-specific data features.

The method 1735 may include instructing 1765 based on the at least one user-specific activity-specific engagement predicting score, at least one computing device to present at least one user-specific activity-related action instruction that predicts at least one user-specific activity-related action to be performed with at least one user.

In some embodiments, the at least one machine-learning model may model and predict the at least one user-specific activity-specific engagement predicting score and/or the at least one user-specific activity-related action instruction that predicts at least one user-specific activity-related action to be performed with at least one user (e.g., at least one recommendation to the financial advisor as to how to cause a particular user to agree to accept and/or use the line of credit to generate revenue for the entity.)

The embodiments disclosed herein improve the overall computational efficiency of the server 15 in contrast to a computing system that processes terabytes of raw user-specific activity specific data for each user from a plurality of users to determine at least one user-specific activity-related action instruction that predicts a user-specific activity-related action to be performed with each user. Such user-specific activity-related actions may include but are not limited to establishing a line of credit within a specific timeframe (e.g., the next 12 months), drawing down a certain amount of funds from that line of credit within a specific timeframe or paying back funds against that line of credit within a specific timeframe, according to a specific temporal pattern(s) or other data driven pattern(s).

The technical improvements result from the machine learning processor 20 using the user-specific activity specific data to generate smaller datasets of labeled data and/or data features, which is transformed using the machine learning models to the user-specific activity-specific engagement predicting score for each user. The machine learning processor 20 may use the user-specific activity-specific engagement predicting score to instruct any of the P computing devices 90A and 90B to display a user-specific activity-related action to be performed with each user.

Thus, the ordered combination of the data pipelines disclosed herein to generate the smaller user-specific datasets, may be transformed by the machine learning processor 20 to output user-specific activity-specific engagement predicting score used for displaying a user-specific activity-related action to be performed with each user. These embodiments provide a technical improvement by significantly improving the computing speed and computationally efficiency relative to a system that merely processes the raw user-specific activity specific data. Such technical improvements enrich existing customer data with a layer of behavioral customer data. Using such behavioral data, multiple signals can be predicted in order for example but not limited to maximizing business metrics such as customer lifetime value, net margin contribution by customer and other key metrics.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors, such as one or more machine learning processors 20. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a social media post, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD, NetBSD, OpenBSD; (2) Linux; (3) Microsoft Windows; (4) OS X (MacOS); (5) MacOS 11; (6) Solaris; (7) Android; (8) iOS; (9) Embedded Linux; (10) Tizen; (11) WebOS; (12) IBM i; (13) IBM AIX; (14) Binary Runtime Environment for Wireless (BREW); (15) Cocoa (API); (16) Cocoa Touch; (17) Java Platforms; (18) JavaFX; (19) JavaFX Mobile; (20) Microsoft DirectX; (21) .NET Framework; (22) Silverlight; (23) Open Web Platform; (24) Oracle Database; (25) Qt; (26) Eclipse Rich Client Platform; (27) SAP NetWeaver; (28) Smartface; and/or (29) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, the terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

As used herein, a "financial instrument" refers to an equity ownership, debt or credit, typically in relation to a corporate or governmental entity, where the financial instrument is typically traded via one or more financial trading venues. Some examples of "financial instruments" can include, but are not limited to, stocks, bonds, commodities, swaps, futures, and currency.

Figure 20:
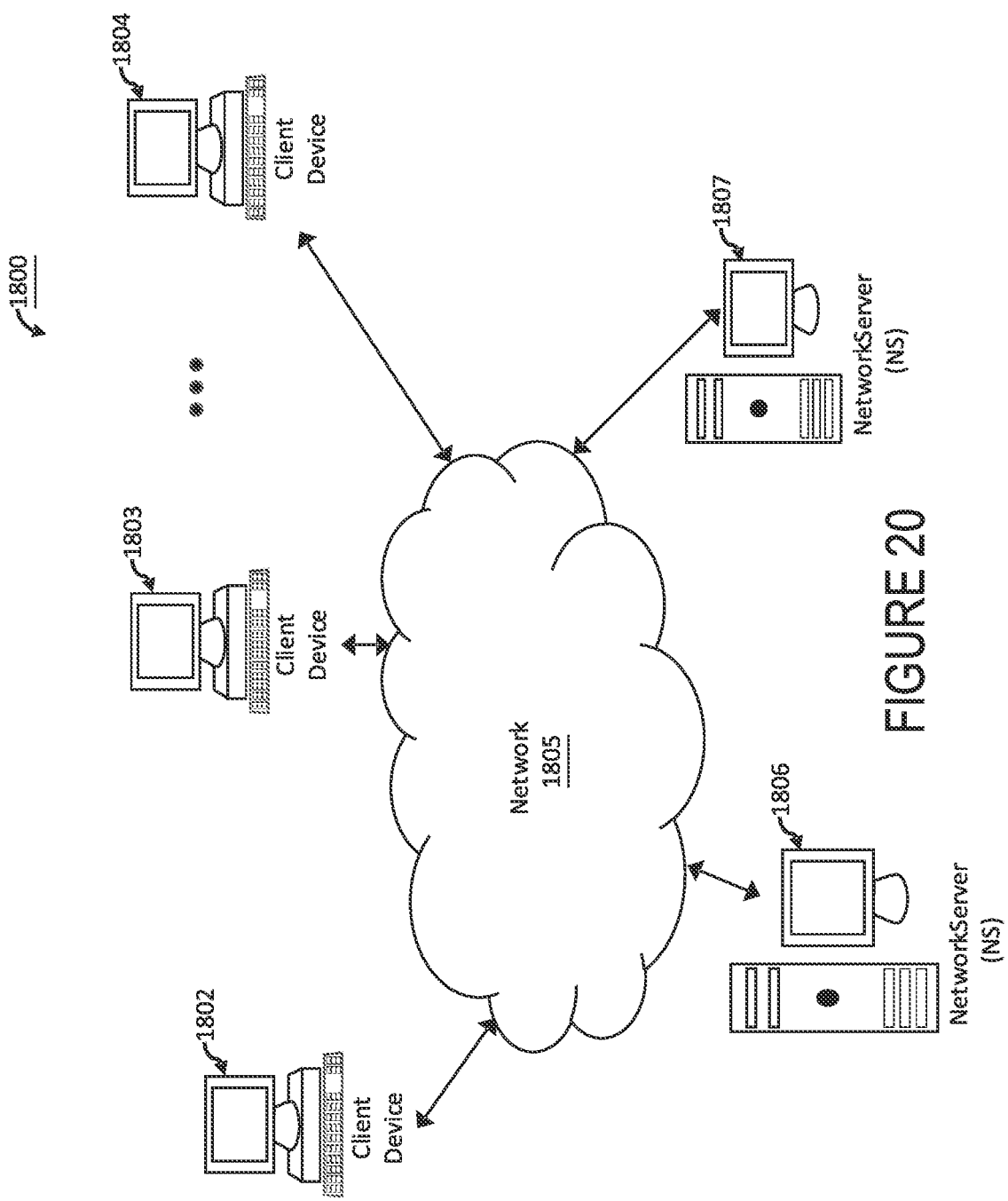
FIG. 20 depicts a block diagram of an exemplary computer-based system/platform in accordance with one or more embodiments of the present disclosure.

FIG. 20 depicts a block diagram of an exemplary computer-based system/platform 1800 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 1800 may be configured to manage a large number of members and/or concurrent transactions, as detailed herein. In some embodiments, the exemplary computer-based system/platform 1800 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 20, members 1802-1804 (e.g., clients) of the exemplary computer-based system/platform 1800 may include virtually any computing device capable of receiving and sending a message over a network (e.g., cloud network), such as network 1805, to and from another computing device, such as servers 1806 and 1807, each other, and the like. In some embodiments, the member devices 1802-1804 may be personal computers, multiprocessor systems, microprocessor-based or programmable consumer electronics, network PCs, and the like. In some embodiments, one or more member devices within member devices 1802-1804 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 1802-1804 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 1802-1804 may include may run one or more applications, such as Internet browsers, mobile applications, voice calls, video games, videoconferencing, and email, among others. In some embodiments, one or more member devices within member devices 1802-1804 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 1802-1804 may be specifically programmed by either Java, .Net, QT, C, C++ and/or other suitable programming language. In some embodiments, one or more member devices within member devices 1802-1804 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 1805 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 1805 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 1805 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 1805 may also include mass storage, such as network attached storage (NAS), a storage area network (SAN), a content delivery network (CDN) or other forms of computer or machine readable media.

In some embodiments, the exemplary server 1806 or the exemplary server 1807 may be a web server (or a series of servers) running a network operating system, examples of which may include but are not limited to Microsoft Windows Server, Novell NetWare, or Linux. In some embodiments, the exemplary server 1806 or the exemplary server 1807 may be used for and/or provide cloud and/or network computing. Although not shown in FIG. 20, in some embodiments, the exemplary server 1806 or the exemplary server 1807 may have connections to external systems like email, SMS messaging, text messaging, ad content providers, etc. Any of the features of the exemplary server 1806 may be also implemented in the exemplary server 1807 and vice versa.

In some embodiments, one or more of the exemplary servers 1806 and 1807 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 1801-1804.

In some embodiments and, optionally, in combination of any embodiment described above or below, for example, one or more exemplary computing member devices 1802-1804, the exemplary server 1806, and/or the exemplary server 1807 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 21:
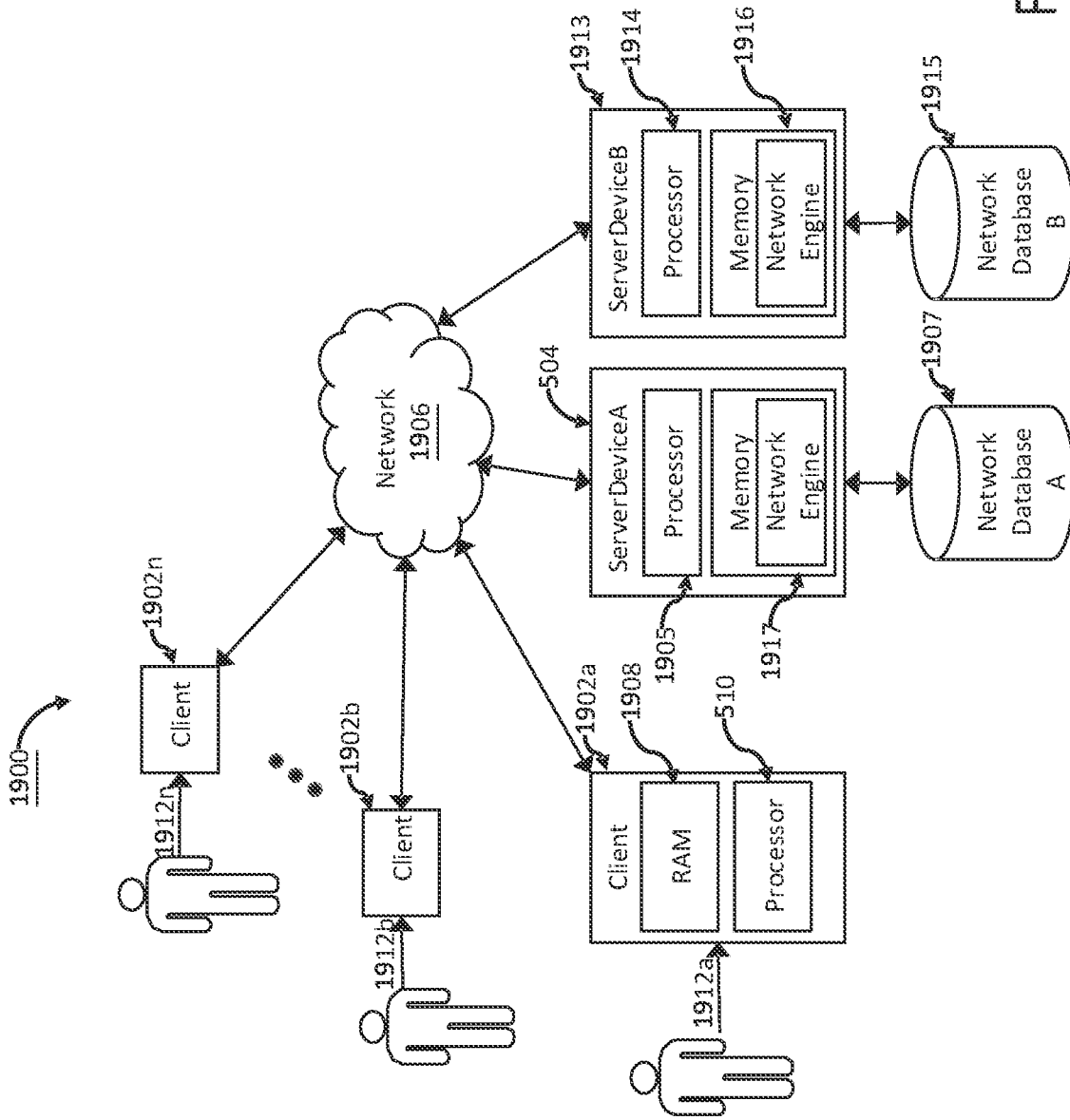
FIG. 21 depicts a block diagram of another exemplary computer-based system/platform in accordance with one or more embodiments of the present disclosure.

FIG. 21 depicts a block diagram of another exemplary computer-based system/platform 1900 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 1902a, 1902b dim 1902n shown each at least includes a computer-readable medium, such as a random-access memory (RAM) 1908 coupled to a processor 1910 or FLASH memory. In some embodiments, the processor 1910 may execute computer-executable program instructions stored in memory 1908. In some embodiments, the processor 1910 may include a microprocessor, an ASIC, and/or a state machine. In some embodiments, the processor 1910 may include, or may be in communication with, media, for example computer-readable media, which stores instructions that, when executed by the processor 1910, may cause the processor 1910 to perform one or more steps described herein. In some embodiments, examples of computer-readable media may include, but are not limited to, an electronic, optical, magnetic, or other storage or transmission device capable of providing a processor, such as the processor 1910 of client 1902*a*, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Ped, JavaScript, and etc.

In some embodiments, member computing devices 1902*a* through 1902*n* may also comprise a number of external or internal devices such as a mouse, a CD-ROM, DVD, a physical or virtual keyboard, a display, a speaker, or other input or output devices. In some embodiments, examples of member computing devices 1902*a* through 1902*n* (e.g., clients) may be any type of processor-based platforms that are connected to a network 1906 such as, without limitation, personal computers, digital assistants, personal digital assistants, smart phones, pagers, digital tablets, laptop computers, Internet appliances, and other processor-based devices. In some embodiments, member computing devices 1902*a* through 1902*n* may be specifically programmed with one or more application programs in accordance with one or more principles/methodologies detailed herein. In some embodiments, member computing devices 1902*a* through 1902*n* may operate on any operating system capable of supporting a browser or browser-enabled application, such as Microsoft™, Windows™, and/or Linux. In some embodiments, member computing devices 1902*a* through 1902*n* shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 1902*a* through 1902*n*, users, 1912*a* through 1912*n*, may communicate over the exemplary network 1906 with each other and/or with other systems and/or devices coupled to the network 1906. As shown in FIG. 21, exemplary server devices 1904 and 1913 may be also coupled to the network 1906. In some embodiments, one or more member computing devices 1902*a* through 1902*n* may be mobile clients.

In some embodiments, at least one database of exemplary databases 1907 and 1915 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 22:
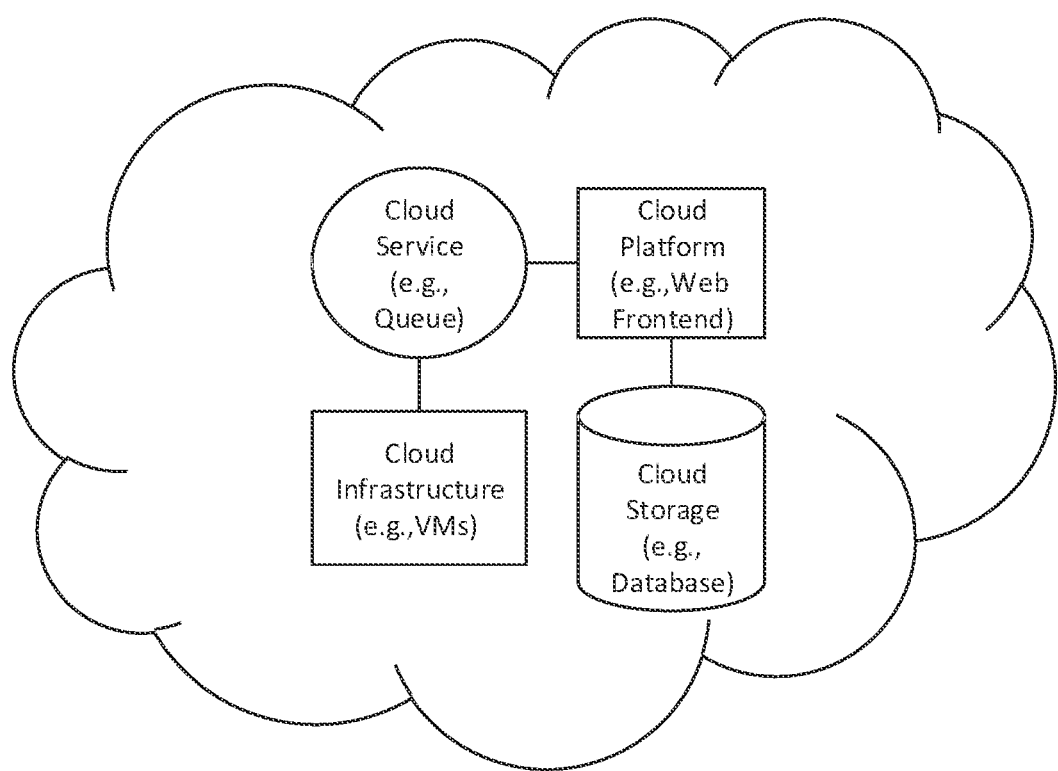
FIGS. 22 and 23 are diagrams illustrating implementations of cloud computing architecture/aspects with respect to which the disclosed technology may be specifically configured to operate, in accordance with one or more embodiments of the present disclosure.
Figure 23:
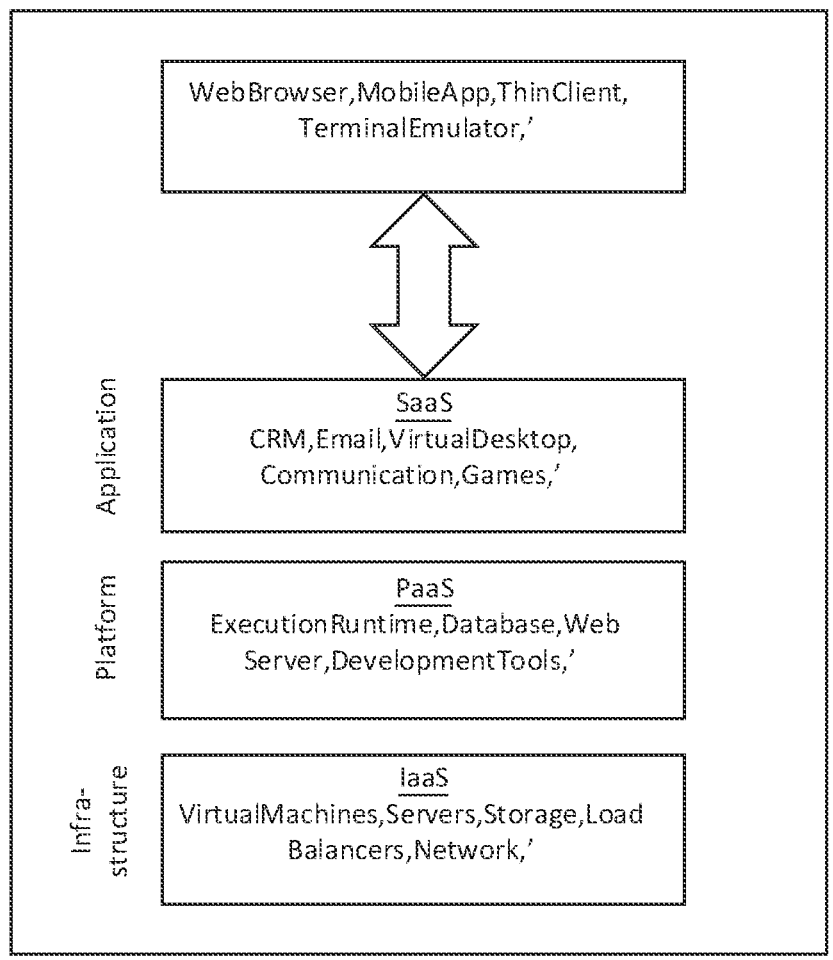

In some embodiments, the exemplary inventive computer-based systems/platforms, the exemplary inventive computer-based devices, and/or the exemplary inventive computer-based components of the present disclosure may be specifically configured to operate in an cloud computing/architecture such as, but not limiting to: infrastructure a service (IaaS), platform as a service (PaaS), and/or software as a service (SaaS). FIGS. 22 and 23 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

In some embodiments, the exemplary inventive computer-based systems/platforms, the exemplary inventive computer-based devices, and/or the exemplary inventive computer-based components of the present disclosure may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:

i) Define Neural Network architecture/model,
ii) Transfer the input data to the exemplary neural network model,
iii) Train the exemplary model incrementally,
iv) determine the accuracy for a specific number of timesteps,
v) apply the exemplary trained model to process the newly-received input data,
vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

At least some aspects of the present disclosure will now be described with reference to the following numbered clauses.

1. A method may include:
    receiving, by a machine-learning processor, an instruction to model at least one user-specific activity-specific engagement predicting score for at least one user from a plurality of users;
    obtaining, by the machine-learning processor, from a plurality of digital resources, based on the instruction, user-specific, activity-specific data;
    where the user-specific, activity-specific data may include:
        (i) at least one user-specific activity performance data regarding performance of at least one activity by the at least one user,
        (ii) at least one object data for at least one object that allows the at least one user to perform the at least one activity, and
        (iii) at least one user-specific personal data of the at least one user;
    predicting, by the machine-learning processor, a user-specific activity engagement labeling data for the at least one activity by utilizing a first-type data pipeline on the at least one user-specific activity performance data;
    predicting, by the machine-learning processor, a plurality of user-specific, activity-specific data features by utilizing a second-type data pipeline on the user-specific, activity-specific data;
    predicting, by the machine-learning processor, based on at least one machine-learning model, the at least one user-specific activity-specific engagement predicting score, by utilizing:
        i) the user-specific activity engagement labeling data for the at least one activity and
        ii) the plurality of user-specific, activity-specific data features; and
    instructing, by the machine-learning processor, based on the at least one user-specific activity-specific engagement predicting score, at least one computing device to present at least one user-specific activity-related action instruction that predicts at least one user-specific activity-related action to be performed with at least one user.

2. The method according to clause 1, where the predicting the at least one user-specific activity-specific engagement predicting score may include outputting a prediction utilization score by the at least one machine-learning model indicative of a likelihood that the at least one user will use a line of credit.

3. The method according to clause 1, where the predicting the at least one user-specific activity-specific engagement predicting score may include outputting a prediction utilization score by the at least one machine-learning model indicative of a likelihood that the at least one user will churn a line of credit after given to the at least one user. (In other embodiments, the prediction utilization score may be indicative of a likelihood that the churning occurs within a pre-defined time interval.)

4. The method according to clause 1, where the predicting the user-specific activity engagement labeling data by utilizing the first-type data pipeline may include using a times-series data pipeline to identify and to label at least one loan, at least one line of credit or any combination thereof used by the at least one user.

5. The method according to clause 1, where the predicting of the plurality of user-specific, activity-specific data features may include using a feature data pipeline on the user-specific, activity-specific data with the user-specific, activity-specific data.

6. The method according to clause 1, where the obtaining of the user-specific, activity-specific data with the at least one user-specific activity performance data regarding the performance of the at least one activity by the at least one user may include obtaining a loan data, a line of credit data, or both respectively of a loan, a line of credit, or both, that the at least one user used, churned, or both.

7. The method according to clause 1, where the obtaining of the user-specific, activity-specific data with the at least one object data for the at least one object that allows the at least one user to perform the at least one activity may include obtaining at least one asset data for at least one asset that provides collateral for the at least one user to obtain a loan, a line of credit, or both.

8. The method according to clause 1, where the at least one user is a single user, and where the instructing the at least one computing device may include instructing the at least one computing device to display a prediction utilization score indicative of a likelihood that the single user will use a line of credit.

9. The method according to clause 1, where the at least one user is a single user, and where the instructing the at least one computing device may include instructing the at least one computing device to display a prediction utilization score indicative of a likelihood that the at least one user will churn a line of credit after given to the at least one user.

10. The method according to clause 1, where the at least one user is a set of users from the plurality of users, and where the instructing the at least one computing device includes instructing the at least one computing device to display a prediction utilization score for each user in the set.

11. The method according to clause 10, further including ranking, by the machine-learning processor, the prediction utilization score for each user in the set, and displaying, by the machine-learning processor, a ranking of the users based on the ranked prediction utilization score for each user in the set.

12. The method according to clause 11, where the instructing the at least one computing device may include displaying recommendations for convincing the ranked users in the set to apply for a loan, a line of credit, or both.

13. A system may include a memory and a machine learning processor. The machine-learning processor may execute computer code stored in the memory that causes the machine-learning processor to:

receive an instruction to model at least one user-specific activity-specific engagement predicting score for at least one user from a plurality of users;

obtain from a plurality of digital resources, based on the instruction, user-specific, activity-specific data;
where the user-specific, activity-specific data may include:
(i) at least one user-specific activity performance data regarding performance of at least one activity by the at least one user,
(ii) at least one object data for at least one object that allows the at least one user to perform the at least one activity, and
(iii) at least one user-specific personal data of the at least one user;

predict a user-specific activity engagement labeling data for the at least one activity by utilizing a first-type data pipeline on the at least one user-specific activity performance data;

predict a plurality of user-specific, activity-specific data features by utilizing a second-type data pipeline on the user-specific, activity-specific data;

predict based on at least one machine-learning model, the at least one user-specific activity-specific engagement predicting score, by utilizing:
i) the user-specific activity engagement labeling data for the at least one activity and
ii) the plurality of user-specific, activity-specific data features; and instruct based on the at least one user-specific activity-specific engagement predicting score, at least one computing device to present at least one user-specific activity-related action instruction that predicts at least one user-specific activity-related action to be performed with at least one user.

14. The system according to clause 13, where the machine-learning processor is configured to predict the at least one user-specific activity-specific engagement predicting score by outputting a prediction utilization score by the at least one machine-learning model indicative of a likelihood that the at least one user will use a line of credit.

15. The system according to clause 13, where the machine-learning processor is configured to predict the at least one user-specific activity-specific engagement predicting score by outputting a prediction utilization score by the at least one machine-learning model indicative of a likelihood that the at least one user will churn a line of credit after given to the at least one user. (In other embodiments, the prediction utilization score may be indicative of a likelihood that the churning occurs within a predefined time interval.)

16. The system according to clause 13, where the machine-learning processor is configured to predict the user-specific activity engagement labeling data by utilizing the first-type data pipeline by using a times-series data pipeline to identify and to label at least one loan, at least one line of credit or any combination thereof used by the at least one user.

17. The system according to clause 13, where the machine-learning processor is configured to predict the plurality of user-specific, activity-specific data features by using a feature data pipeline on the user-specific, activity-specific data with the user-specific, activity-specific data.

18. The system according to clause 13, where the machine-learning processor is configured to obtain the user-specific, activity-specific data with the at least one user-specific activity performance data regarding the performance of the at least one activity by the at least one user by obtaining a loan data, a line of credit data, or both respectively of a loan, a line of credit, or both that the at least one user used or churned.

19. The system according to clause 13, where the machine-learning processor is configured to obtain of the user-specific, activity-specific data with the at least one object data for the at least one object that allows the at least one user to perform the at least one activity by obtaining at least one asset data for at least one asset that provides collateral for the at least one user to obtain a loan, a line of credit, or both. The system according to clause 13, where the at least one user is a single user, and where the machine-learning processor is configured to instruct the at least one computing device by instructing the at least one computing device to display a prediction utilization score indicative of a likelihood that the single user will use a line of credit.

20. The system according to clause 13, where the at least one user is a single user, and where the machine-learning processor is configured to instruct the at least one computing device by instructing the at least one computing device to display a prediction utilization score indicative of a likelihood that the at least one user will churn a line of credit after given to the at least one user.

21. The system according to clause 13, where the at least one user is a set of users from the plurality of users, and wherein the machine-learning processor is configured to instruct the at least one computing device by instructing the at least one computing device to display a prediction utilization score for each user in the set.

22. The system according to clause 22, where the machine-learning processor is further configured to rank the prediction utilization score for each user in the set, and to display a ranking of the users based on the ranked prediction utilization score for each user in the set.

23. The system according to clause 23, where the machine-learning processor is configured to instruct the at least one computing device by displaying recommendations for convincing the ranked users in the set to apply for a loan, a line of credit, or both.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:
1. A method, comprising:
obtaining, by a processor, from a plurality of digital resources user-specific, activity-specific data for at least one user from a plurality of users;
wherein the user-specific, activity-specific data comprises:
(i) at least one user-specific activity performance data regarding performance of at least one activity by the at least one user,

(ii) at least one object data for at least one object that allows the at least one user to perform the at least one activity, and (iii) at least one user-specific personal data of the at least one user;

training, by the processor, a neural network machine learning model to obtain a trained neural network machine learning model that is configured to predict:

(i) a user-specific activity engagement labeling data for the at least one activity based on the at least one user-specific activity performance data;

(ii) a plurality of user-specific, activity-specific data features based on the user-specific, activity-specific data;

(iii) at least one user-specific activity-specific engagement predicting score, based on the user-specific activity engagement labeling data for the at least one activity and the plurality of user-specific, activity-specific data features;

wherein the at least one user-specific activity-specific engagement predicting score is based on a plurality of propensities to engage a plurality of utilization actions associated with the at least one activity;

wherein the training of the neural network machine learning model comprises:

generating a plurality of datasets associated with the user-specific activity-specific data for the plurality of users, inputting, into a neural network machine learning model, the plurality of datasets associated with the user-specific activity-specific data for the plurality of users, and applying the plurality of datasets to an output associated with the neural network machine learning model;

utilizing, by the processor, the trained neural network machine learning model to output the at least one user-specific activity-specific engagement predicting score based on the user-specific activity engagement labeling data for the at least one activity and the plurality of user-specific, activity-specific data features; and instructing, by the processor, based on the at least one user-specific activity-specific engagement predicting score, at least one computing device to present at least one user-specific activity-related action instruction that predicts at least one user-specific activity-related action to be performed with at least one user.

2. The method according to claim 1, wherein the predicting the at least one user-specific activity-specific engagement predicting score comprises outputting a prediction utilization score by the trained neural network machine-learning model indicative of a likelihood that the at least one user will use a line of credit.

3. The method according to claim 1, wherein the predicting the at least one user-specific activity-specific engagement predicting score comprises outputting a prediction utilization score by the trained neural network machine-learning model indicative of a likelihood that the at least one user will churn a line of credit after given to the at least one user.

4. The method according to claim 1, wherein the predicting the user-specific activity engagement labeling data by utilizing the first-type data pipeline comprises using a times-series data pipeline to identify and to label at least one loan, at least one line of credit, or any combination thereof used by the at least one user.

5. The method according to claim 1, wherein the predicting of the plurality of user-specific, activity-specific data features comprises using a feature data pipeline on the user-specific, activity-specific data with the user-specific, activity-specific data.

6. The method according to claim 1, wherein the obtaining of the user-specific, activity-specific data with the at least one user-specific activity performance data regarding the performance of the at least one activity by the at least one user comprises obtaining a loan data, a line of credit data, or both respectively of a loan, a line of credit, or both, that the at least one user used, churned, or both.

7. The method according to claim 1, wherein the obtaining of the user-specific, activity-specific data with the at least one object data for the at least one object that allows the at least one user to perform the at least one activity comprises obtaining at least one asset data for at least one asset that provides collateral for the at least one user to obtain a loan, a line of credit, or both.

8. The method according to claim 1, wherein the at least one user is a single user; and wherein the instructing the at least one computing device comprises instructing the at least one computing device to display a prediction utilization score indicative of a likelihood that the single user will use a line of credit.

9. The method according to claim 1, wherein the at least one user is a single user; and wherein the instructing the at least one computing device comprises instructing the at least one computing device to display a prediction utilization score indicative of a likelihood that the at least one user will churn a line of credit after given to the at least one user.

10. The method according to claim 1, wherein the at least one user is a set of users from the plurality of users; and wherein the instructing the at least one computing device comprises instructing the at least one computing device to display a prediction utilization score for each user in the set.

11. The method according to claim 10, further comprising:

ranking, by the processor, the prediction utilization score for each user in the set; and displaying, by the processor, a ranking of the users based on the ranked prediction utilization score for each user in the set.

12. The method according to claim 11, wherein the instructing the at least one computing device comprises displaying recommendations for convincing the ranked users in the set to apply for a loan, a line of credit, or both.

13. A system, comprising:

a computer memory; and a processor which executes computer code stored in the computer memory that causes the processor to:

obtain, from a plurality of digital resources user-specific, activity-specific data for at least one user from a plurality of users;

wherein the user-specific, activity-specific data comprises:

(i) at least one user-specific activity performance data regarding performance of at least one activity by the at least one user, (ii) at least one object data for at least one object that allows the at least one user to perform the at least one activity, and (iii) at least one user-specific personal data of the at least one user;

train a neural network machine learning model to obtain a trained neural network machine learning model that is configured to predict:
(i) a user-specific activity engagement labeling data for the at least one activity based on the at least one user-specific activity performance data;
(ii) a plurality of user-specific, activity-specific data features based on the user-specific, activity-specific data;
(iii) at least one user-specific activity-specific engagement predicting score, based on the user-specific activity engagement labeling data for the at least one activity and the plurality of user-specific, activity-specific data features;
wherein the at least one user-specific activity-specific engagement predicting score is based on a plurality of propensities to engage a plurality of utilization actions associated with the at least one activity;
wherein the training of the neural network machine learning model comprises:
generating a plurality of datasets associated with the user-specific activity-specific data for the plurality of users,
inputting, into a neural network machine learning model, the plurality of datasets associated with the user-specific activity-specific data for the plurality of users, and
applying the plurality of datasets to an output associated with the neural network machine learning model;
utilize the trained neural network machine learning model to output the at least one user-specific activity-specific engagement predicting score based on the user-specific activity engagement labeling data for the at least one activity and the plurality of user-specific, activity-specific data features; and
instruct, based on the at least one user-specific activity-specific engagement predicting score, at least one computing device to present at least one user-specific activity-related action instruction that predicts at least one user-specific activity-related action to be performed with at least one user.

14. The system according to claim 13, wherein the predicting the at least one user-specific activity-specific engagement predicting score comprises outputting a prediction utilization score by the trained neural network machine-learning model indicative of a likelihood that the at least one user will use a line of credit.

15. The system according to claim 13, wherein the predicting the at least one user-specific activity-specific engagement predicting score comprises outputting a prediction utilization score by the trained neural network machine-learning model indicative of a likelihood that the at least one user will churn a line of credit after given to the at least one user.

16. The system according to claim 13, wherein the predicting the user-specific activity engagement labeling data by utilizing the first-type data pipeline comprises using a times-series data pipeline to identify and to label at least one loan, at least one line of credit, or any combination thereof used by the at least one user.

17. The system according to claim 13, wherein the predicting of the plurality of user-specific, activity-specific data features comprises using a feature data pipeline on the user-specific, activity-specific data with the user-specific, activity-specific data.

18. The system according to claim 13, wherein the obtaining of the user-specific, activity-specific data with the at least one user-specific activity performance data regarding the performance of the at least one activity by the at least one user comprises obtaining a loan data, a line of credit data, or both respectively of a loan, a line of credit, or both, that the at least one user used, churned, or both.

19. The system according to claim 13, wherein the obtaining of the user-specific, activity-specific data with the at least one object data for the at least one object that allows the at least one user to perform the at least one activity comprises obtaining at least one asset data for at least one asset that provides collateral for the at least one user to obtain a loan, a line of credit, or both.

20. The system according to claim 13, wherein the at least one user is a single user; and
wherein the instructing the at least one computing device comprises instructing the at least one computing device to display a prediction utilization score indicative of a likelihood that the single user will use a line of credit.

* * * * *